(12) United States Patent
Khaishgi et al.

(10) Patent No.: US 7,424,457 B2
(45) Date of Patent: Sep. 9, 2008

(54) MANAGING AN ELECTRONIC SEAL OF CERTIFICATION

(75) Inventors: Ahmedulla Khaishgi, San Francisco, CA (US); Katherine Libonate, Walnut Creek, CA (US); John Quinn, San Francisco, CA (US); Vincent Tseng, Cambridge, MA (US); Steven D. Abernethy, San Francisco, CA (US)

(73) Assignee: SquareTrade, Inc., San Francisco, CA (US)

( * ) Notice: Subject to any disclaimer, the term of this patent is extended or adjusted under 35 U.S.C. 154(b) by 0 days.

(21) Appl. No.: 10/714,758

(22) Filed: Nov. 17, 2003

(65) Prior Publication Data

US 2004/0153414 A1    Aug. 5, 2004

Related U.S. Application Data

(63) Continuation-in-part of application No. 09/634,149, filed on Aug. 8, 2000, now Pat. No. 6,658,394.

(60) Provisional application No. 60/470,345, filed on May 14, 2003.

(51) Int. Cl.
    *G06Q 99/00* (2006.01)
(52) U.S. Cl. .................. 705/50; 705/10; 705/1; 705/80; 705/26
(58) Field of Classification Search .......... 705/1, 705/37, 50, 80; 77/3
    See application file for complete search history.

(56) References Cited

U.S. PATENT DOCUMENTS

| | | | |
|---|---|---|---|
| 5,495,412 A | 2/1996 | Thiessen | |
| 5,668,953 A | 9/1997 | Sloo | |
| 5,893,117 A | 4/1999 | Wang | |
| 5,893,905 A | 4/1999 | Main et al. | |
| 5,895,450 A | 4/1999 | Sloo | |
| 5,956,687 A | 9/1999 | Wamsley et al. | |
| 5,970,475 A | 10/1999 | Barnes et al. | |
| 6,237,096 B1 | 5/2001 | Bisbee et al. | |
| 6,330,551 B1 | 12/2001 | Burchetta et al. | |
| 6,347,332 B1 | 2/2002 | Malet et al. | |
| 6,363,384 B1 | 3/2002 | Cookmeyer, II et al. | |
| 6,389,151 B1 | 5/2002 | Carr et al. | |

(Continued)

FOREIGN PATENT DOCUMENTS

EP    0 689 824 A1    1/1996

(Continued)

OTHER PUBLICATIONS

Lundholm, Russell J., "Reporting on the past: A new approach to improving accounting today", Dec. 1999, Accounting Horizons v13n4 pp:. 315-322.*

(Continued)

*Primary Examiner*—Jalatee Worjloh
(74) *Attorney, Agent, or Firm*—Shumaker & Sieffert, P.A.

(57) ABSTRACT

Systems and methods for managing a seal of certification including compliance with requirements for such a seal of certification in electronic commerce including an online marketplace, particular sectors of an online marketplace and a web site and dynamic display of a media object representative of such a seal of certification and systems and methods for applying, customizing, displaying and administering such seals of certification.

65 Claims, 56 Drawing Sheets

U.S. PATENT DOCUMENTS

| | | |
|---|---|---|
| 6,442,687 B1 | 8/2002 | Savage |
| 6,470,448 B1 | 10/2002 | Kuroda et al. |
| 6,658,394 B1 | 12/2003 | Khaishgi et al. |
| 6,766,307 B1 | 7/2004 | Israel et al. |
| 2001/0007106 A1 | 7/2001 | Slaikeu |
| 2002/0007362 A1 | 1/2002 | Collins et al. |
| 2002/0022970 A1* | 2/2002 | Noll et al. ............... 705/1 |
| 2002/0038293 A1 | 3/2002 | Seiden |
| 2002/0073008 A1* | 6/2002 | Dutta et al. ............ 705/37 |
| 2003/0028762 A1 | 2/2003 | Trilli et al. |
| 2003/0069857 A1* | 4/2003 | Junda .................... 705/74 |
| 2003/0188194 A1 | 10/2003 | Currie et al. |
| 2004/0010463 A1* | 1/2004 | Hahn-Carlson et al. ..... 705/39 |
| 2004/0128155 A1 | 7/2004 | Vaidyanathan et al. |
| 2004/0210527 A1 | 10/2004 | Woda et al. |
| 2004/0230512 A1* | 11/2004 | Gulati .................. 705/36 |
| 2004/0243802 A1 | 12/2004 | Jorba |
| 2005/0044009 A1* | 2/2005 | Stone et al. ............ 705/26 |

FOREIGN PATENT DOCUMENTS

| | | |
|---|---|---|
| JP | 2003-114927 | 10/2001 |

OTHER PUBLICATIONS

Nyhart, "Computer Modeling in Dispute Resolution: An Overview," *Dispute Resolution Forum*, Apr. 1988, p. 3, 11-15.

Elangovan, "Managerial third-party dispute intervention: A prescriptive model of strategy selection," *Academy of Management Review*, vol. 20, No. 4, pp. 800-830 (Oct. 1995).

Bordone, Robert C., "175 Electronic Online Dispute Resolution: A Systems Approach-Potential, Problems, and a Proposal," Harvard Negotiation Law Review, pp. 175-211, 1998, http://cyber.law.harvard.edu/property00/jurisdiction/bordoneedit.html.

Chua, Lusan, "Ebay: Conflict Management in an Online Community," 2002, http://www.ombuds.org/cyberweek2003/chua.paper.htm.

Devack, Melissa, "Intellectual Property As An Investment: A Look At How ADR Relates to the European Union's Proposal for Electronic Commerce in the Single Market," 2002, http://www.cardozo.yu.edu/cojcr/final_site/articles_notes/vol2_an/Devack.htm.

Geist, Michael, "Fair.com?: An Examination of the Allegations of Systemic Unfairness in the ICANN UDRP," University of Ottawa, Aug. 2001, http://aix1.uottawa.ca/~geist/geistudrp.pdf.

Gilbert, Pamela, "On Space, Sex and Stalkers," http://www.echonyc.com/~women/Issue17/art-gilbert.html.

Johnson, David R., "Dispute Resolution in Cyberspace," http://www.eff.org/Legal/Arbitration/online_dispute_resolution_johnson.article, Feb. 1994.

Katsh, Ethan M., "Dispute Resolution in Cyberspace," Conn. L. Rev., 1996, http://www.umass.edu/legal/articles/unconn.html.

Katsh, Ethan et al., E-Commerce, E-Disputes, and E-Disputes Resolution: In the Shadow of "eBay Law", Ohio State Journal on Dispute Resolution, vol. 15:3, pp. 705-734, 2000.

Manevy, Isabelle, "Online Dispute Resolution: what future?" Jun. 2001, http://www.ombuds.org/cyberweek2002/manevy_odr01.pdf.

Mudd Jr., Charles Lee, "Cybercourt: A Virtual Resolution of Differences," 1995, http://www.mudd.org/professional/articlesclm/cybercourt.htm.

Rabinovich-Einy, Orna, "The Ford-Firestones of the Future: Resolving Offline Disputes in an Online Society," http://www.ombuds.org/cyberweek2003/rabinovich_einy.htm.

Schneider, Michael E. et al., "Dispute Resolution in International Electronic Commerce," http://www.disputes.net/cyberweek2001/interElecCommerce.htm.

SchWeber, Claudine, "The Use of Technology in Conflict Resolution," 1995, http://www.batnet.com/oikoumene/arbtadr.html.

Thiessen, Ernest et al.,"Beyond Win-Win in Cyberspace," Ohio State J. of Dispute Resolution, 2000, 15(3), 643, http://www.smartsettle.com/more/beyond/BeyondWinWin.html.

"ADR Resources," Center for Information Technology and Dispute Resolution, http://www.ombuds.org/center/articles1.

"Code of Online Business Practices," Council of Better Business Bureau, Inc., 2003, http://www.bbonline.org/reliability/code/code.asp.

"Disputes in cyberspace 2001," Update for Online Disputes Resolution for Consumers in Cross-Border Disputes, Office for Developed and Transition Economies, Consumers International, Nov. 2001.

"Out-of-Court Dispute Settlement Systems for E-Commerce," The Report form the workshop held in Brussels, European Commission Report.

"Proceedings of a Conference on Electronic Dispute Resolution," National Center for Automated Information Research (NCAIR), May 22, 1996, Washington D.C.

Declaration of Ethan Katsh Under 37 C.F.R. 1.132.

Explanation of 'contract' and 'marketplace' printed from http://www.dictionary.com.

Information on Bell Atlantic, 1998, 1999.

Information on Neural Tech, Inc., 1996-1998.

Unisys to market Neural Tech CADRE software as part of its credit card dispute processing solution set, Oct. 22, 1998.

U. S. Appl. No. 09/504,159, filed Feb. 15, 2000, entitled "Electronic Dispute Resoultion System," by Khaishgi, Ahmed et al.

U. S. Appl. No. 10/634,654, filed Aug. 5, 2003, entitled "System and Method for Resolving a Dispute in Electronic Commerce and Managing an Online Dispute Resolution Process," by Khaishgi, Ahmed et al.

U. S. Appl. No. 10/672,136, filed Sep. 26, 2003, entitled "Automated Online Dispute Resolution," by Khaishgi, Ahmed et al.

http://www.arb-forum.com—National Arbitration Forum.

http://www.i-courthouse.com—I-Courthouse, Inc.

http://wwwinternational.com—Internet Neutral.

http://www.arbiter.wipo.int/arbitration/—WIPO Arbitration and Mediation Center.

http://www.clicknsettle.com—clickNsettle.com, Inc.

http://www.cybersettle.com—Cybersettle.com.

http://www.onlineresolution.com—OnlineResolution—Mediation.

http://www.iescrow.com—I-Escrow Inc.

http://www.resolution.org—Resolution Forum, Inc.

http://www.disputes.org—Disputes.Org.

http://www.ebay.com—eBay Inc.

http://www.digimarc.com—Digimarc.

http://www.webassured.com—WebAssured.com.

http://www.bbbonline.com—BBBonline (A Better Business Bureau Program).

http://www.valuestar.com—ValueStar, Inc.

http://www.verisign.com—VeriSign Internet Trust Services.

http://www.truste.com—TRUSTe.

http://www.paypal.com—PayPal.

http://www.betterweb.com—BetterWeb Program.

http://www.clicksure.com—Clicksure Ltd.

International Search Report from corresponding PCT Application Serial No. PCT/US04/14726, mailed Jun. 1, 2005 (3 pages).

Written Opinion from corresponding PCT Application Serial No. PCT/US04/14726, mailed Jun. 1, 2005 (3 pages).

Y. Chu et al., "PICS Signed Labels (DSig) 1.0 Specification," http://www.w3.org/TR/REC-DSig-label, May 27, 1998, 20 pgs.

G. Eysenbach et al., "Towards quality management of medical information on the internet: evaluation, labelling, and filtering of information," British Medical Journal (BMJ), vol. 317, Nov. 28, 1998, pp. 1496-1502.

G. Eysenbach et al., "Labeling and Filtering of Medical Information on the Internet," Methods of Information in Medicine, vol. 38, 1999, pp. 80-88.

Non-Profit Dating Service retrieved from the Internet Archive Wayback Machine of data Feb. 19, 1999, (4 pages).

www.truste.com retrieved from the Internet Archive Wayback Machine, (63 pages).

www.shopping.com, 2 pages (last printed Apr. 5, 2005).

www.epinions.com, 2 pages (last printed Apr. 5, 2005).

www.bizrate.com, 2 pages (last printed Apr. 5, 2005).

www.nextag.com, 1 page (last printed Apr. 5, 2005).

www.pricegrabber.com, 2 pages (last printed Apr. 5, 2005).

www.cnet.com, 4 pages (last printed Apr. 5, 2005).

www.buysafe.com, 1 page (last printed Apr. 5, 2005).

www.geotrust.com, 1 page (last printed Apr. 5, 2005).
www.scanalert.com, 1 page (last printed Apr. 5, 2005).
www.hackersafe.com, 1 page (last printed Apr. 5, 2005).
www.comodogroup.com, 2 pages (last printed Apr. 5, 2005).
www.nabp.net, Verified Internet Pharmacy Practice Sites (VIPPS™), A Program of the *National Association of Boards of Pharmacy*, 2 pages (last printed Apr. 5, 2005).

www.webtrust.org/abtseals.htm, 9 pages (last printed Apr. 5, 2005).
www.epubliceye.com, 1 page (last printed Apr. 5, 2005).
www.gomez.com, 1 page (last printed Apr. 5, 2005).
www.visa.com, 1 page (last printed Apr. 5, 2005).
www.guardianecommerce.net, 2 pages (last printed Apr. 5, 2005).

* cited by examiner

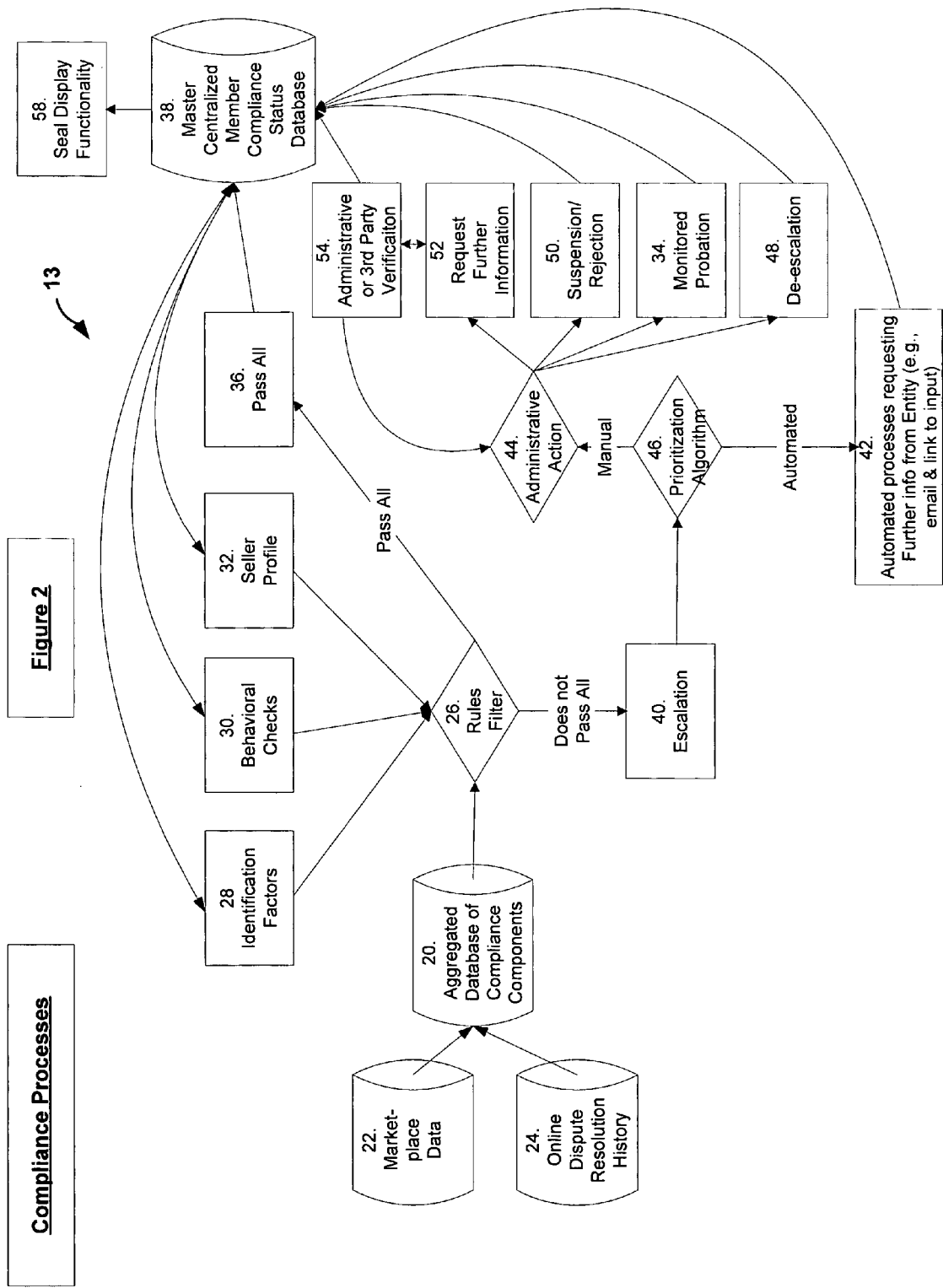

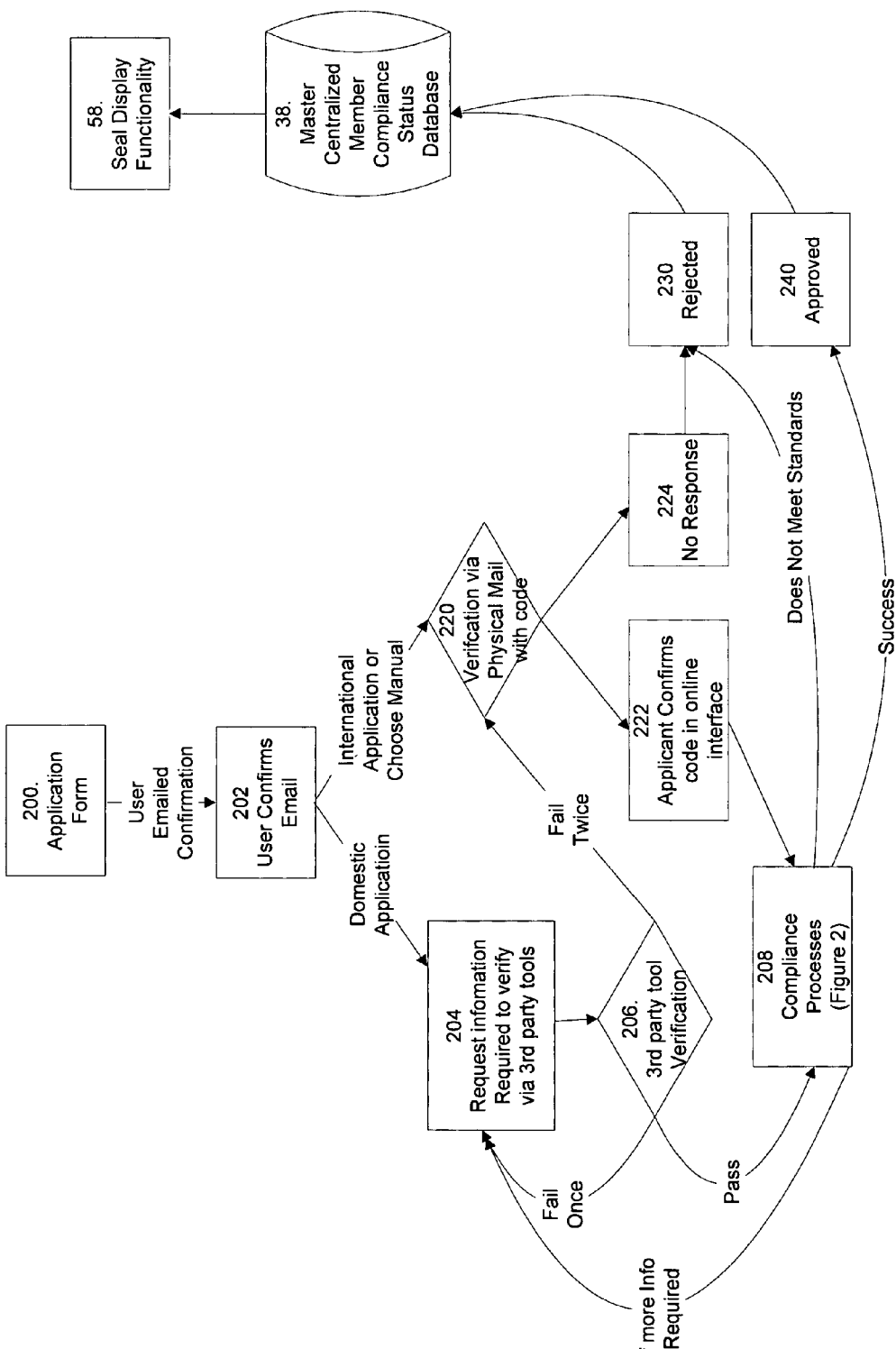

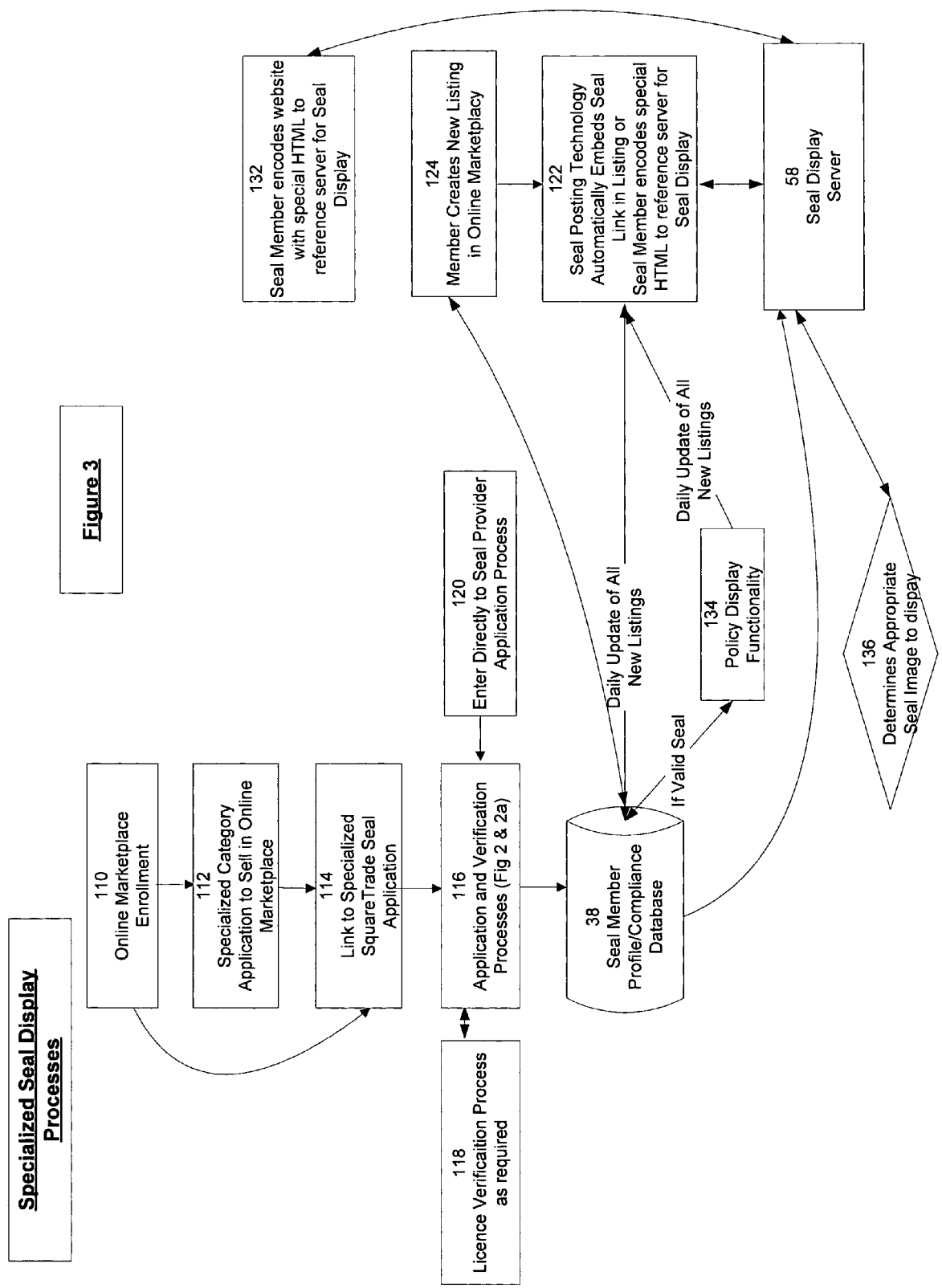

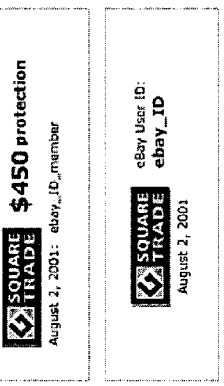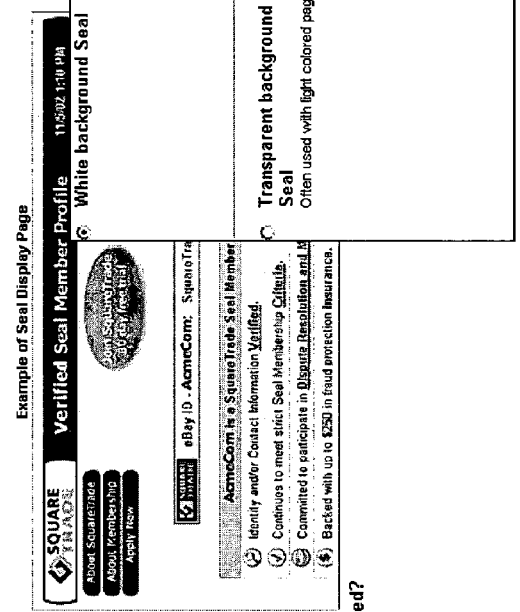
Figure 8

Service Plan: Choosing Buyer Protection

Return to My Seal page

SquareTrade Service Plans - choose your Best Option!

*Save!*

| Plan Benefits | | STANDARD | PREFERRED | SECURE |
|---|---|---|---|---|
| Buyer Protection | ? | $450 | $750 | $1000 |
| Feedback Removal Discount | ? | | 10% | 10% |
| Business Reporting Center | ? | 7 Reports | 10 Reports | 20 Reports |
| Bidder Management | ? | | Basic | Advanced |
| Warranty Posting & Cash Bonus | ? | | | $ |
| Featured Seller | ? | | ✓ | ✓ |
| Negative Feedback Notification | ? | ✓ | ✓ | ✓ |
| Winning Bidder Alerts | ? | ✓ | ✓ | ✓ |
| Plan Rates | | $7.50 / mth | $82.50 / yr<br>$7.50 savings | $25 / mth $275 / yr<br>$25 savings |
| SELECT YOUR PLAN HERE > | | Current Plan | ⊙  1 month Free | ⊙  ⊙<br>1 month Free  1 month Free |

Select the Service Plan that best meets your auction needs. When you click the submit button, you will be charged for your new plan. A credit will be applied for any unused portion of your current plan.

Figure 9

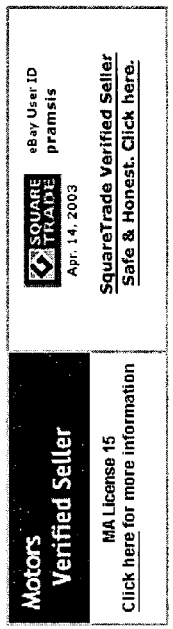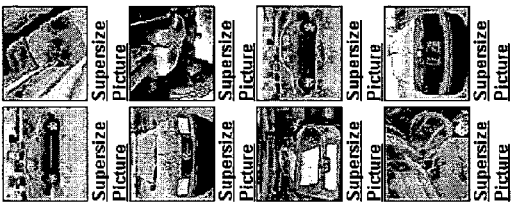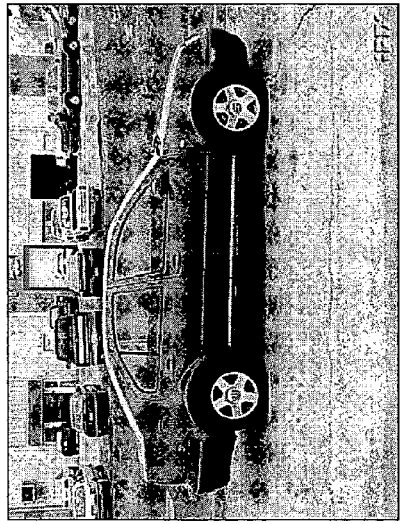
Figure 11

Specific Seal Program - Travel

Why it is safe to make purchases from eBay Travel sellers

All sellers in the Airline, Cruises, Lodging, and Vacation Packages categories have been verified through the Seller Verify by SquareTrade Program. This program helps ensure that sellers have the necessary qualifications to sell in these categories. These sellers also must commit to specific selling standards and – in the case that something does go wrong – purchases are automatically insured for up to $500. Read more about the fraud protection below.

> Further explains why all sellers within Travel are verified. Therefore uses Compliance database, but doesn't need the Seal

Benefits to Travel category buyers

Buyers in Travel enjoy all of these benefits:

- Sellers' identity and qualifications to sell in Travel have been verified before any of the items are listed. Learn more about Travel seller qualifications.
- Sellers have committed to SquareTrade's selling standards
  All sellers agree to maintain high selling and customer service standards. Learn more about SquareTrade's selling standards.
- $500 fraud protection
  Often, a misunderstanding can be resolved with a simple conversation. But if you are unable to resolve your situation, we can help. SquareTrade's fraud protection program provides $300 of insurance coverage (less a $25 deductible) in addition to the $200 provided by eBay (less a $25 deductible). That means you have up to $500 of insurance (less a $50 deductible), if you meet the eligibility guidelines of the fraud protection programs.
  Each of these protection programs works independently and you'll have to apply to each one separately. Learn more about the eBay Fraud Protection Program and the SquareTrade Fraud Protection Program.
- Sellers have committed to SquareTrade's Online Dispute Resolution if the need arises. If mediation is necessary, sellers have agreed to use a simple four-step dispute resolution process. Learn more about SquareTrade's Online Dispute Resolution.

Figure 14

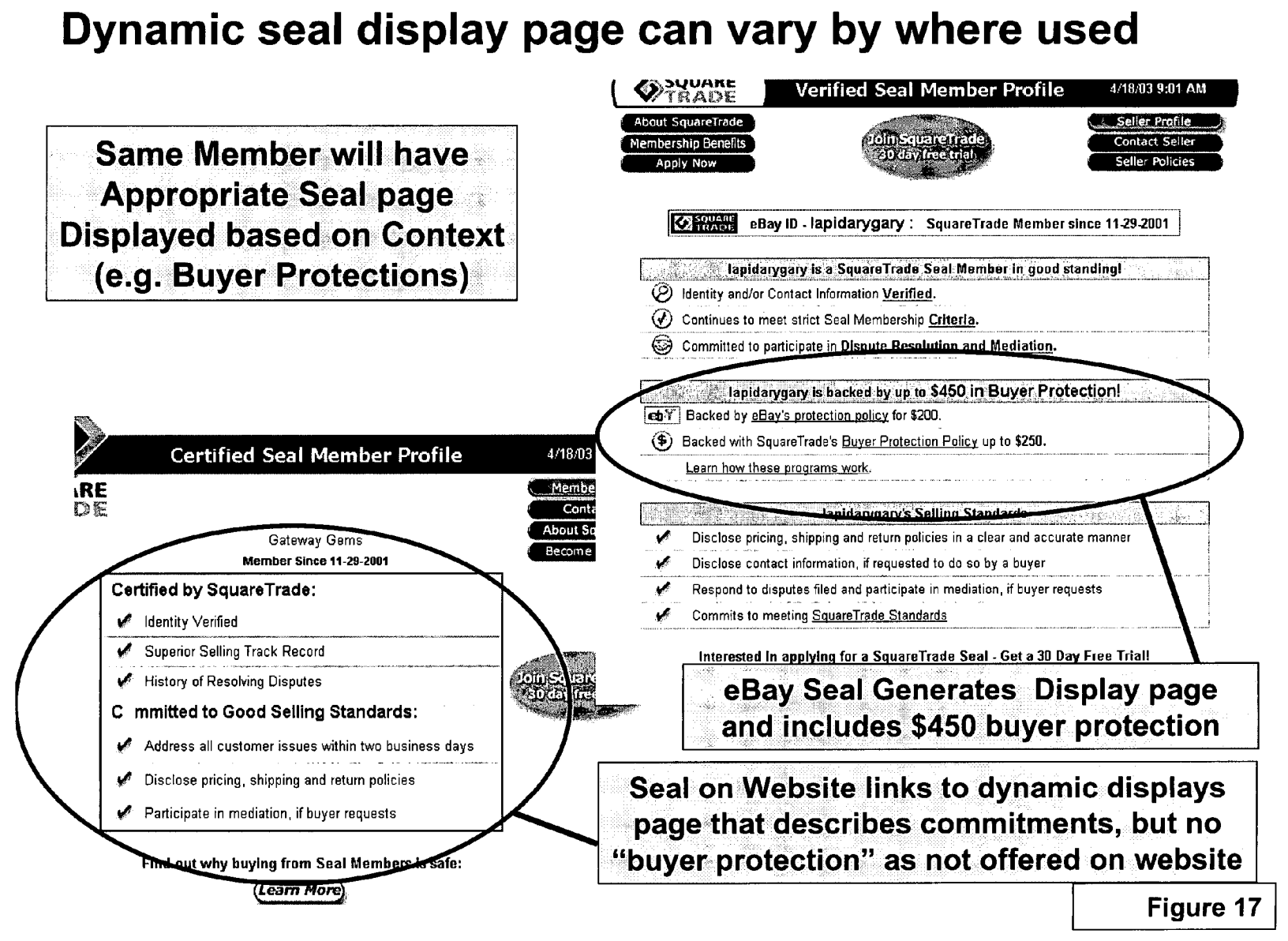

Dynamic seal display page can vary by where used

Same Member will have Appropriate Seal page Displayed based on Context (e.g. Buyer Protections)

eBay Seal Generates Display page and includes $450 buyer protection

Seal on Website links to dynamic displays page that describes commitments, but no "buyer protection" as not offered on website

Figure 17

Policy Definition

Simple Policy Creation Tool

Display Your Selling Policies

Define Your Policies

Review Your Listing Policies: We have taken the policies you have already defined with SquareTrade and automatically generated the following policies to be displayed on your eBay listings.

Preview: To see exactly what the policies will look like on your eBay listings.

Edit Your Listings Policies: Use the form below to edit your policies using either Plain Text or HTML. Once you define your policies, click "Submit" and they will automatically post to your ebay listings.

Plain Text: Make any changes to your policies using plain text.

HTML: If you would like to use HTML, eBay has published a simple HTML help guide. (Please note: return strokes are interpreted as line breaks, so you do NOT have to put in the code <br>)

Further Assistance: If you want assistance defining your policies, click here. This tool will guide you through the 15 specific policies that buyers most care about. Please Note - Any text you may have written in the form below will be overwritten if you choose to use this tool.

PAYMENTS

List all the Payment Methods that you accept.
1. Do you offer PayPal, Credit Card, Money Order, and/or Personal Check?
2. Which payment method do you prefer?
3. Do you have any restrictions regarding payment?

```
0   characters left    PREVIEW
METHODS ACCEPTED: PayPal (Preferred)
```

FEES

Inform the buyer of any State Taxes or Handling Fees applied.
1. Do you charge any State Taxes? If State Taxes are charged clearly di and the percentage charged for each State.
2. Do you charge any handling fees in addition to shipping charges?

---

Tool to define detailed policies, categorized as relevant to a particular marketplace
- Payments
- Fees
- Shipping
- Delivery
- Refunds & Returns
- Contact Me

---

Summary of My Selling Policies

| Payment | METHODS ACCEPTED: PayPal (Preferred) |

BID WITH CONFIDENCE
Read my policies on my SquareTrade Seal

Close window

Figure 20

Policy Creation Wizard

Policy Wizard

Shipping Example

Define your Selling Policy - Shipping Options

Instructions

1. Define all your shipping policies and the shipping options you offer.
2. For each shipping option, define the following:
   - whether you accept it
   - the cost
   - the insurance options
   - the tracking options
   - the average time for delivery, and where that option is available
   - any other comments
3. Read helpful details by clicking on Hints or the Shipping Options.
4. If you define an option as Not Applicable, it will NOT be shown on your policies page.
5. Questions? Contact us by Live Chat or call us at 1-800-666-6007

What Buyers look for in your Shipping Policies:

1. Full Disclosure: Buyers are mostly fine with your shipping policies as long as they are clear and there are no surprises.
2. Fairness: If your shipping charges are substantially higher than the true shipping rates, explain why.
3. No Surprises: Showing a few examples of what sample items will cost will help buyers feel more comfortable.

Shipping Policies:

Please fill out this form completely

Figure 24: Policy Display on Clicking Seal

Setting Bidder Management Parameters

Set alerts & parameters to view at risk winning bidders

SQUARE TRADE

SquareTrade Services: | Seal Program | Dispute Resolution | My Seal
Posting Overview | Disputes Overview | Services Overview | Account Services Home  Help  Log Out
Learn More Welcome Andy Mowery! (that's not me)

Bookmark this page | Return to My Seal page

Bidder Management - Identify Your Priority Buyers

The Bidder Management report details your Alerted Winning Bidders. Use the report to identify which of your Winning Bidders need a bit of extra special attention and care. Give these bidders the service they deserve to avoid non-payment.

To change your Alert Settings, simply enter the requested information below, click refresh and you'll be provided with the tools that can help you understand and manage your relationship with your Winning Bidders.

Click here to turn on email reports.

There are no new Alerted Winning Bidders as of 05/11/03. Your current settings may be limiting Winning Bidders from appearing on your report. Review and update your settings as you see fit.

| REPORT PARAMETERS | | | ALERTS | | ALERT SETTINGS |
|---|---|---|---|---|---|
| Item Close Price | ? | Up to 100 | ID Verified | | ☐ Alert On |
| Buyer Feedback | ? | less than 50 | Private Feedback | | ☑ Alert On |
| Close Date | ? | Up to 1 Days | Buyer Location | | United States |
| Report Display | ? | All Items | Sunglasses | | ☑ Alert On |
| Items to Display | ? | Up to 25 Items | Registration Date | REG | Within 90 Days |

REFRESH ▶

Figure 25

Bidder Management Online Report

Bidder Management - Identify Your Priority Buyers

The Bidder Management report details your Alerted Winning Bidders. Use the report to identify which of your Winning Bidders need a bit of extra special attention and care. Give these bidders the service they deserve to avoid non-payment.

To change your Alert Settings, simply enter the requested information below, click refresh and you'll be provided with the tools that can help you understand and manage your relationship with your Winning Bidders.

Click here to turn on email reports.

AUCTION REPORT

| Close Date | Item Description | Close Price | Buyer eBay ID | Buyer FB | Alerts |
|---|---|---|---|---|---|
| 05/10/03 | 30# DIGITAL Postal Scale POSTAGE | $28.89 | 10521 | 0 | REG ● |
| 05/10/03 | NEW Drinkwell Pet Fountain & 6 C | $39.89 | 10411 | 14 | ● |
| 05/09/03 | My Weigh TOUCHSCALE 2000 DIGITAL | $64.89 | 10332 | 4 | ● |
| 05/08/03 | 30# DIGITAL Postal Scale POSTAGE | $29.89 | 20000 | 37 | ● |
| 05/08/03 | Drinkwell Pet Fountain RESV4Filt | $54.89 | 20322 | 1 | ● |
| 05/08/03 | NEW Drinkwell Pet Fountain Water | $30.89 | 20045 | 20 | REG ● |
| 05/08/03 | c1940 PC Bell Motor Court, Hampt | $5.99 | 21212 | 39 | ● |
| 05/08/03 | NEW Drinkwell Pet Fountain & 6 C | $38.89 | 21112 | 46 | ● |
| 05/08/03 | 1951 Cliff Dwellers Bodies Manit | $8.27 | 23333 | 1 | REG ● |
| 05/08/03 | c1950 Hunting, Man Shooting Duck | $5.99 | 32112 | 11 | REG ● |
| 05/08/03 | 1947 Postcard Boats, Silver Spr | $5.99 | 22100 | 7 | ● |
| 05/08/03 | NEW Rapitest Soil pH Meter Test | $12.99 | 22101 | 0 | |
| 05/08/03 | NEW Rapitest Soil pH Meter Test | $12.99 | 20020 | 0 | |
| 05/07/03 | NEW Drinkwell Pet Fountain & 6 C | $38.89 | 10444 | 0 | |
| 05/07/03 | 1931 Pool, Bath, Lake Killarney, | $5.99 | 14040 | 0 | |
| 05/07/03 | 1939 CSHall Culver Stockton Coll | $5.99 | 23445 | 0 | |
| 05/07/03 | Drinkwell Pet Fountain RESV+7Fil | $58.89 | 24555 | 0 | |
| 05/07/03 | 1958 Postcard Voyager Motel Risc | $2.99 | | | |

Callouts:
- Clickable transaction information
- Bidder ID given with 1-click to email bidder
- Bidder Feedback Level
- Alert Types Highlighted

Figure 26

Seal Application - Commit to Standards

Member must commit to Marketplace Specific Standards, e.g., Online Dispute Resolution

Specific standards can be dynamically required for each seal program or buyer protection (e.g., Motors Verified Seal)

| SquareTrade Services: | Seal Program | Dispute Resolution | My Seal |
| Overview | Learn More | Apply Now | Fees & Services | Buyer Tools |

SQUARE TRADE

The SquareTrade Standards

First and foremost, Sellers are expected to explicitly define their selling policies, which are to be fair and informative, and to disclose relevant information to their buyers. All SquareTrade Seal Members have agreed to maintain high selling and customer service standards, including but not limited to:

- Responding to disputes filed against them using the SquareTrade Dispute Resolution process. Responses are expected to be professional and Seal Members are expected to participate in good faith.
- Abiding by agreements made during SquareTrade Dispute Resolution Process and completing the resolution in a timely manner.
- Describing in a clear and accurate manner on their listings and/or website:
  - Goods and services for sale
  - Pricing, including applicable fees
  - Policies on after sales services, such as refunds and shipping policies.
- Offering products for sale that comply with the marketplace's guidelines
- Disclosing Contact Information, including the company name under which they do business, e-mail address, and physical addresses if requested to do so by a buyer. Contact information must be sufficient to ensure customers can contact Seal Members offline.
- Defining a Privacy Policy if they are displaying the Seal on a website and they collect personally identifiable information and use the information for marketing purposes. The policy must be explicitly defined.

*SquareTrade makes no representation that the SquareTrade Seal Member is complying with these Standards, nor are we responsible for monitoring compliance with these Standards. If you believe a Seal Member has violated these Standards, please contact compliance@squaretrade.com.*

*SquareTrade's Compliance group will investigate complaints made by buyers against a Seal Member for violation of these standards. If, in SquareTrade's sole opinion, a Seal Member is found to consistently violate these Standards and/or fail to act in a fair and ethical manner, their SquareTrade Seal membership may be suspended.*

Figure 32

Seal Application - Generic

Application Page 2 of 3

Your information is protected by SquareTrade's privacy policy & secure SSL encryption.

*All fields are required unless noted.*

Title: [Mr.] First Name: [____] MI: [__] Last Name: [____]

Email Address: [____] Confirm Email Address: [____]

Create Password (5-20 characters): [____] Confirm Password: [____]

Company Name: [____]

Company Address  *Why do you need it?*  [____]  Company Address Ctd. (optional): [____]

City: [____]  State: [Please choose ▼]  Zip Code: [____]

Company Phone Number: [____] Ext [__]

Dun & Bradstreet # (optional): [____]  Federal Employer Identification # (EIN): [__-____]

Home Address  *Why do you need it?*  [____]  Apt # (optional): [____]

City: [____]  State: [Please choose ▼]  Zip Code: [____]

Home Phone Number: [__-__-____]

eBay User ID  *Why do you need it?*  [____]  eBay Password  *Why do you need it?*  [____]

Your Website Address (if applicable): [____]

No obligations after this 30 Day Free Trial!

The Seal is seen by buyers over 50 million times every month!

Address Verification

Figure 33

Seal Application - Generic

Application Page 3 of 3

IMPORTANT: Your information is protected by SquareTrade's confidentiality policy and secure SSL encryption.

Billing Verification

First Name on Credit Card

Last Name on Credit Card

Address on Card

Address (line 2)

City

State/Province

Country
[United States ▼]

Zip Code

Card Type
[Visa ▼]

Credit Card Number

Expiration (MM/YYYY)
[01 ▼] [2003 ▼]

Referred by a Seal Member? If so, enter their email address or Seal ID# here. Otherwise leave it blank.

☐ I acknowledge I have read and accepted the SquareTrade Standards.
☐ I acknowledge I have read and accepted the SquareTrade Seal Member Agreement.
☐ Prepay and Save! Upgrade to the *PREFERRED* Plan by signing up for one year. You'll get 2 months free and other special benefits with a one-time payment of $75.00 (regular fee $90).

This special offer is only available at the time of signup. Learn more.

[SUBMIT]

*PREFERRED PLAN*
• Two Months Free: 12 months for the price of 10!
• 10% discount on mediations
• $750 Buyer Protection

Learn More

Figure 34

Seal Application - Travel Program

SquareTrade Travel Verification - Get started now, it's easy!

eBay requires all sellers of Travel who plan to list the following items to be a Travel Verified Seller by SquareTrade. To learn more about this program, click here. Please choose which of the following items you plan to sell:

- ○ Lodging and Vacation Packages without AIR (Hotels, B & B's, Timeshares, and Vacation Rentals)
- ○ Cruises and the category above.
- ○ Airline Tickets and Vacation Packages with AIR and the categories above (excluding Frequent Flier Miles, Rapid Rewards, Coupons or Vouchers)
- ○ None of the Above There is a $10.00 Application Processing fee for Verification for eBay Travel. You will be charged the non-refundable fee at the submission of your application. Once approved, you will receive a 30 day free trial, after which you will be charged the standard fee of $7.50. You can cancel at any time

[CONTINUE] 

Please note:

Airline coupons, vouchers and similar items can still be bought and sold in "Other Travel" subject to the posted rules of the Travel category. However, eBay does not permit listings of "choice" travel certificates by any user. For detailed eBay listing policies, click here.

Members selling coupons and similar items in "Other Travel" are NOT required to participate in the Seller Verify by SquareTrade Program. Therefore you do not need to fill out this application.

Travel Specific Verification Details

Figure 35

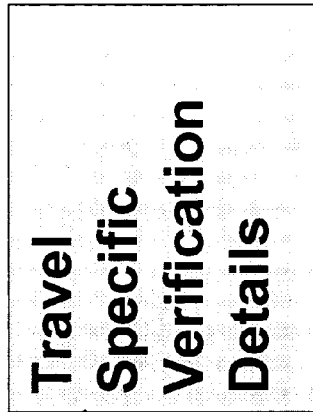
Figure 36

Seal Application - Travel Program

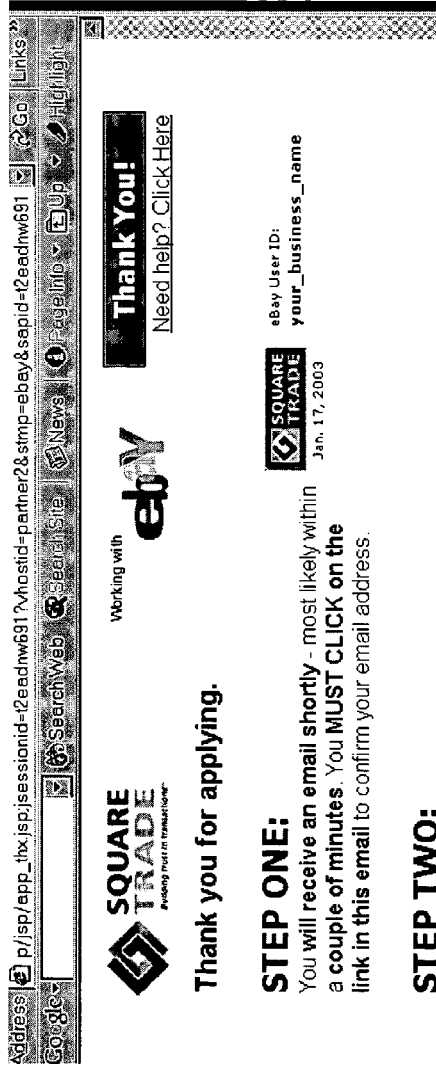

Thank you for applying.

STEP ONE:
You will receive an email shortly - most likely within a couple of minutes. You MUST CLICK on the link in this email to confirm your email address.

STEP TWO:

Examples of approved fax documentation: Please include your eBay User Id and Email address on the fax, and fax to 1-443-363-2256.

- PROPERTY OWNERS - Documentation that demonstrates your ownership.
  - A monthly bill (i.e. utility, cable) that has the Property Address that you plan to list and includes your name.

- TIMESHARE MEMBERS - Documentation that demonstrates your membership.
  - Maintenance Fee Bill
  - Timeshare Deed
  - "Exchange Confirmation" from your time membership i.e RCI or Interval International
  - Utility Bill Your application will NOT be approved, until you complete the above step.

If you have any additional questions, feedback or suggestions during the application review process, please email us at memberservices@squaretrade.com.

Travel Specific Verification Requirements

Figure 37

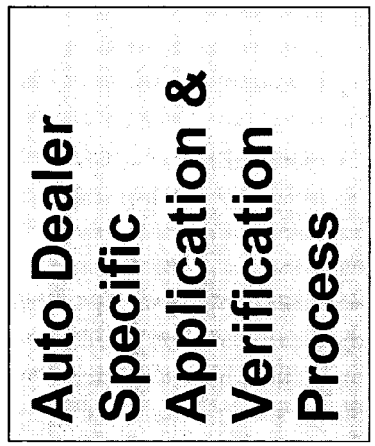
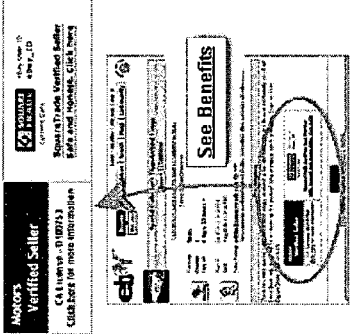
Figure 38

Seal Application - Motors Program

Verification Email

Physical Letter Verification

«FIRST_NAME» «LAST_NAME»
«ADDRESS»
«CITY», «STATE» «ZIP»

SquareTrade Seal – Contact Information Verification

Dear «FIRST_NAME»

Thank you for applying for the SquareTrade Seal. Please follow the instructions below to help us verify your contact information.

1. Enter this website address into your browser:
   http://www.squaretrade.com/verify
2. Enter your verification code: «VERIFICATION_CODE»

If you have questions about this address verification letter, please contact us directly by email at memberservices@squaretrade.com.

Sincerely,
SquareTrade Member Services

Frequently Asked Questions:

*1. Is entering this code required for approval?*
If your application has not yet been approved, then you MUST enter this code to verify your physical address. We will not continue processing your application until your address has been verified.

*2. How long will approval take after I enter this code?*
You will most likely be approved within 2 business days after you enter the code.

Figure 42

Compliance Admin: Setting Identity Level

Individual View    Check Overview    Identity Verification    Escalation Summary

Identity Verification Overview

Seal Member  10512    Last Updated: 07:20 PM 04/15/2003

View of Individual Member Risk

Identity Level: *30*

Person Identity Level: 40

| | Status | Last Modified |
|---|---|---|
| Email Reponsiveness | PASS | 06:00 PM 04/15/2003 |
| eBay ID Verified | FAIL | 07:20 PM 04/15/2003 |
| Equifax | PASS | 06:00 PM 04/15/2003 |
| Equifax Exempt | - | |
| Fax | - | |
| Address Verified by Letter *confirmation code* | - | 05:09 PM 04/15/2003 |
| Manual | - | |

Update

Company Identity Level:

| | Status | Last Modified |
|---|---|---|
| Dun & Bradstreet | - | |
| Tax ID | - | |
| Employment | - | |
| Fax | - | |
| 3rd Party Source | - | |
| Supplemental | - | |

Update eBay Feedback Level

| | Score | Last Modified |
|---|---|---|
| feedback-id-verify | 40 | 07:20 PM 04/15/2003 |

Figure 48

Compliance Admin: Setting Probation

Compliance Administration

Individual View | Check Overview | Identity Verification | Escalation Summary

Compliance Check Summary

Seal Member: 10512 | Last Updated: 07:20 PM 04/15/2003

Escalation Score: 62

| Check Name | Score | Probation Threshold | Probation End Date | Remove Probation | Add Probation |
|---|---|---|---|---|---|
| account-info-status | 0 | | | | |
| bulk-computers | 0 | | | | |
| duplicate-seal-instance More... | 80 | | | | ○ |
| ebay-suspension | 0 | | | | |
| ebay-travel-seller | 0 | | | | |
| feedback-level | 25 | | | | |
| high-risk-miv | 29 | | | | |
| high-value-items | 29 | | | | ○ |
| odr-history More... | 50 | | | | |
| private-feedback | 0 | | | | |
| recent-bad-seller-feedback | 0 | | | | ○ |
| total-expected-miv | 50 | | | | |

Reset | Next

View of Individual Member Risk and Ability to Manually Adjust

Figure 49

Compliance Admin: Setting Probation (2)

Compliance Administration

Compliance Check Probation

Seal Member: 10512

| Check Name | Score | Threshold | Duration | | Notes |
|---|---|---|---|---|---|
| duplicate-seal-instance | 80 | 81 | 3 | months | duplicate seal was rejected due to insufficient identity verification |
| total-expected-miv | 50 | 51 | 30 | days | One high value item |
| odr-history | 50 | 51 | 3 | months | Case responded to |

Submit

Home | Search | Search Results
All contents ©1999-2003 by SquareTrade

View of Individual Member Risk and Ability to Manually Adjust

Figure 50

Compliance Admin: Specific Programs

Adjust approval parameters specific to Seal Programs (e.g., eBay Motors)

TRUSTE — Subscription Administration
*Building trust in transactions*

Subscription Summary for seal: 10512

Add subscription
Change subscription
Remove subscription
Go to individual compliance view

| CREATE DATE | SERVICE | STATUS | PACKAGE | *NOTES |
|---|---|---|---|---|
| 01/17/2003 | eBay Motors Posting | Pending | Motors Standard | |
| 01/17/2003 | Featured Seller | - | Motors Standard | - |
| 01/17/2003 | Fraud Protection Guarantee $550 | - | Motors Standard | - |
| 01/17/2003 | Unlimited Listings | - | Motors Standard | - |
| 01/17/2003 | Negative Feedback Notification | - | Motors Standard | - |
| 01/17/2003 | ODR Mediation 20% Discount | - | Motors Standard | - |
| 01/17/2003 | Referral Points | - | Motors Standard | - |
| 01/17/2003 | Seal Activity Reports | - | Motors Standard | - |

[Update]

*notes will only be recorded if status value is modified

Return to search

Figure 51

Compliance Admin: Initiating Escalation Action

SQUARE TRADE
*Building trust in transactions*

Compliance Administration

Escalation: Waiting for Manager Action

Seal Member: 10512

Check one or more of the boxes below to initiate a request for information to the seal member OR click here to withdraw this escalation.

- ☐ Letter Code Address Verification
- ☐ Equifax Identity Verification
- ☐ Company Information
- ☐ Request Additional Information

[Submit]

---

Home | Search | Search Results
All contents ©1999-2003 by SquareTrade

Figure 52

Compliance: Interface for User-provided Info

TRADE

Welcome Vincent Tsengl (that's not me)

You have an Action Item!

Our records indicate that you were recently flagged by a routine check of our compliance system. As a result, we need some additional information from you.

This process will only take a couple minutes to complete, and is required to maintain your account status. If you do not attend to this right now, you will be reminded the next time you log in.

We use this information for the purpose of verifying your identity, and may check the information you provide against 3rd party databases to verify that it is correct.

---

☐ to do  Identity Verification
You will be asked to provide your Social Security # and your Date of Birth for verification. We use Equifax, the leading provider of verification solutions, to check your information.
This process is completely secure.

☐ to do  Company Verification
SquareTrade typically requires sellers selling large quantities and/or high value merchandise to show proof that they are an established business, and capable of reliably filling orders. Please provide some information about your company.

☐ to do  Further information
Please answer a question about your selling.

Remind me Later

Figure 54

Compliance: More Info to be Provided

Verify Company Information

SquareTrade typically requires sellers selling large quantities and/or high value merchandise to show proof that they are an established business, and capable of reliably filling orders. Please provide some information about your company.

Company Name

Company Address

Company Address Ctd. (optional)

City

State/Province/Region

Company Phone Number    Ext

Zip Code

Dun & Bradstreet Number

Tax ID Number

Years in Business

Your Title

Number of Employees
1 - 5

*Submit*

Figure 55

MANAGING AN ELECTRONIC SEAL OF CERTIFICATION

This application is a Continuation-in-part of Ser. No. 09/634,149, filed Aug. 8, 2000 now U.S. Pat. No. 6,658,394, and claims priority to U.S. Provisional Patent Application Ser. No. 60/470,345, filed May 14, 2003, the entire contents of which are incorporated herein by reference

TECHNICAL FIELD

This invention relates to computer networks and, more particularly, to techniques for management of electronic seals of certification in electronic commerce.

BACKGROUND

One of the difficulties a user faces when engaging in electronic commerce, for example, from an online marketplace or a web site, is that the user typically has limited contact with online entities. Consequently, the user of electronic commerce often has difficulty knowing or understanding the trustworthiness of an online entity with which the user may wish to do business. This situation is far different from a standard "bricks and mortar" establishment with which a potential customer can have far more contact and in whom the potential customer can more readily judge the establishment's reputation and character.

In an attempt to address this problem, some organizations have established "seals of certification" programs. Under such programs, an online entity may qualify for and receive a seal of certification. The online entity may then display the seal of certification in conjunction with the online entity's electronic commerce.

However, such seals are often misused since they often are not unique to the online entity and are static, i.e., not changing over time. The integrity of such seals can be violated simply by an unscrupulous online entity copying a bitmap of the seal of certification and using the bitmap in conjunction with the electronic commerce of a different online entity.

Thus, a user's confidence in a seal of certification can be rightly misplaced. There is needed a seal of certification program which has the integrity to maintain the trust from users of electronic commerce.

SUMMARY OF THE INVENTION

In general, the techniques herein describe verification, approval and compliance systems, which provide new approaches to managing the risk-associative factors of validating sellers to sell in online marketplaces, or to sell online through their websites, or to sell online in general, or to advertise by being included an online advertiser's merchant network, through an electronic seal program. The systems may be particularly valuable in managing a large seal member base and/or large volume of new applications, by providing a combination of automated and manual processes to effectively interpret the associated large amounts of specific member data, and effectively provide a high integrity system.

The systems described herein provide initial verification, ongoing compliance monitoring, and consider multiple variables to assess the credibility and risk of an entity. For example, the systems can verify an entity's: a) individual identity attributes, such as a social security number and personal address; b) business attributes, such as state or other licensing, employment at a relevant business, third-party validation of business (e.g., Dun and Bradstreet), bank statements, individual ownership rights (or similar) to a property (or similar if selling relates to an entity's credibility in renting a given property); c) historic or current participation behavior in an online dispute resolution system; d) feedback or reputation ratings in an online marketplace; e) historic transaction behavior in an online marketplace or other sales categories; f) current sales behavior in an online marketplace or other sales categories; g) administrative comments based on interaction with the member; h) reported behavior from customers of the entity; and i) pre-commitment to business standards such as to participation in online dispute resolution processes, to self-disclose refund or other policy information, and other variables. Specific verification checks can be added for specific category verification or seal programs in an online marketplace. For example, verifying the credibility of an entity to sell travel or lodging services (e.g., property ownership verification, travel agency employment verification), verifying the credibility of an entity to sell cars online in a given or multiple states may be verified (e.g., dealership verification), verifying the credibility of an entity to sell alcohol or prescription drugs in a given or multiple states may be verified (e.g., alcohol sales license or pharmaceutical prescription licensing repsectively). Ongoing compliance might require that these credentials or checks are performed or re-verified on a regular basis, e.g., daily.

The compliance systems described herein apply an algorithm to analyze the multiple data components for each entity to assess whether the entity is a trustworthy seller. The compliance algorithm can determine, according to its rules, that an entity is in "good standing," and hence approved and "within compliance" as a new member or current member of a seal of certification program. The compliance system can also determine that an entity might be "out of compliance," and require escalation in an automated or manual process. Such escalation can lead to several actions that can include, among other things: de-escalation, cancellation, temporary suspension, monitored probation (meaning a relaxation of rules), request for additional information (e.g., increased verification), request for actions by the entity. The compliance system provides an administrative interface where administers can view entities, prioritized in various ways to help manage a large member base. The compliance interface provides a tool to request and manage the administrative actions of entities.

The verification and compliance systems can be programmed to require increased levels of verification based on these multiple factors of an online entity, including: entity attributes (e.g., history in marketplace, country of residence, categories of sales, marketplace feedback) entity transaction level (e.g., dollar volume, number or current transactions), entity online dispute resolution activity (e.g., the number of disputes involving entity, type of dispute, response behavior). As an example, a seller entity might be approved to sell in an online marketplace with minimal verification (e.g., address verification) as long as the seller limits their selling activity to a low level of transactions or dollar value as set in the compliance systems. When the compliance system recognizes the seller has increased its selling activity above a certain level or that the seller has acquired certain risk characteristics or changes to their selling activity (e.g., selling higher priced items), the system might prompt administrators to request further verification information from the seller or the system might automatically make such a request of the entity, as defined appropriate by the system, (e.g., business licensing, proof of ownership of products being sold, higher id verification such as social security number). Increased verification or re-verification can also be triggered by other activity, such as online dispute resolution (e.g., number of cases, responsiveness to cases, category of disputes), the system might request further verification details. Such checks serve as a multivariable means to help confirm the integrity of the seller and increase the likelihood of an entity meeting their commitments and reducing risks of fraudulent or sub-standard sales behavior.

The compliance systems can support various manners of visibly displaying an entity's compliance and good standing to users in e-commerce and online marketplaces. For example, the compliance systems may be used to support the electronic seal of certification processes for dynamically presenting an electronic seal (or similar dynamic graphic and/or text) that can convey to customers an entity's membership, authenticity (e.g., displaying current date and seller identification), commitments to standards, and associated buyer protections and features. A customized electronic seal (or similar dynamic graphic and/or text) can be dynamically displayed on a seller's website or individual listings in an online marketplace, e.g., auction listings, after the system confirms real-time the current status of the seal member in a centralized database. A specific customized seal is only displayed based upon criteria in the seal issuer's centralized membership compliance database, which is continuously updated by the validation and ongoing compliance systems.

Because the Internet and other electronic networks provide efficient channels to easily access and collect such information, the compliance systems take advantage of this information accessibility to provide sophisticated systems to analyze such historic and current data to maintain a continuous perspective on the compliance and risk of a given entity. The compliance systems may perform verification on a regular basis (e.g., daily), or in real-time so as to ensure that verification is continuously current and based on the latest data. The algorithm to interpret the many factors is architected to allow for adaptation as new correlations or new factors are understood as a means to manage compliance of the entity. Such integration can link the verification and compliance systems to data or sales activity within an online marketplace, payment mechanism, fraud or buyer protection assurance system, or other system.

The automated compliance systems reduce cost in relation to the performance of upfront and ongoing manual audits, which are economically prohibitive. The relatively small sellers, who make up a large component of participants of e-commerce and online marketplaces, generally would not be able justify the cost of these more onerous, traditional auditing procedures. Further, such traditional procedures do not respond quickly enough to the dynamic nature of selling and online fraud where a seller might appear credible on upfront verification, but could quickly change their behavior to defraud buyers. Hence the automated systems combined with real time graphic display of verification and trust, such as an electronically delivered seal, provide valuable new information for sellers to distinguish themselves in an online setting and for buyers to make better, lower risk purchasing decisions.

The seal verification and display systems described herein include seal display functionality allowing dynamic display of details specific to an individual seal member entity (e.g., a seller's marketplace identification, business name) or a specific program, such as a sub-marketplace within an online marketplace (e.g., eBay Motors Verified Seller, Travel Verified Seller) or specific programs displayed through a search engine or when rendered in a website (e.g., Verified Licensed Alcohol Business, Verified Licensed Prescription Drugs Business). Details displayed by seal verification and display systems may vary based on where the specific entity is selling. The functionality ranges from controlling what specific graphic or information is dynamically displayed in or in addition to the seal (e.g., current date, seller's marketplace identification, business name), as well as other information delivered in association with the seal system's functionality. The system hence allows a single entity to have different graphic representations (and associated content, commitments and protections) appear, based upon where the transaction occurs or where the Seal is shown, e.g., the system could display a different seal program graphic for the same entity for several sub-marketplaces in an online marketplace or a different graphic on the entity's website than the entity's marketplace listings. The seal might also display a seller's marketplace identification in one context, and their regular business name in another context. The variable display functionality also can enable customized information to be displayed when the seal (or similar dynamic graphic and/or text) is clicked, based on where the seal is clicked for a given member. For example, the system could display buyer protection details, business license details, and marketplace specific verifications when clicked on in an online marketplace, and only policy clarification if clicked on from an entity's website.

The real-time verification systems can also be used to restrict access of sellers to search engine results, advertiser networks, marketplaces or sub-marketplaces based on the ability or agreement of the sellers to meet specific standards and approval criteria for the search engine, advertiser networks, marketplaces or sub-marketplaces. Therefore, for example, on an occasional, frequent or real-time basis, all listings or new listings within a sub-marketplace, e.g., eBay Travel, are analyzed, and sellers selling items within these sub-marketplaces are verified as being currently approved to sell within these sub-marketplaces. If they are not found in the centralized and continually updated membership compliance database, the sellers may be asked to take down their listings, or their listings may be taken down for them. This level of verification may be done with or without the use of a Seal (or similar dynamic graphic and/or text) and may be based on the centralized updated membership compliance database. Similarly for example, on an occasional, frequent or real-time basis, an advertiser network or a search engine can verify that all or some of their merchants/advertisers who sell within a certain category (e.g., wine or prescription drugs) have all been verified by SquareTrade for the specific category-based program (e.g., Verified Licensed Alcohol Business or Verified Prescription Drugs Program). If they are not found in the centralized and continually updated membership compliance database, the sellers may be asked to stop advertising via the advertiser network or their listings may be pulled down off the search engine results. This level may be done with or without the use of a Seal (or similar dynamic graphic and/or text) and may be based on the centralized updated membership compliance database.

The seal verification and display systems can also dynamically display specific business license information and details on the business license information—and the format and level of information can be different based on the program. For example the Travel Verified Seal—when clicked upon—can display at a high level that a seller is verified, but not necessarily display the license details. The Motors Verified Seal—when clicked upon—can display the Motors license information including the state of licensing and the license number. The Licensed Alcohol Business Program Seal—when clicked upon—can display the Alcohol license information including the licensing body (state or federal), the license #, the type of license, the date of license verification etc.

The seal verification and display systems can also dynamically display specific buyer protections offered for transactions with the entity. This means that entities can register to dynamically display buyer protections along with their Seal (or similar related graphic and/or text). For example the buyer protections could offer an entity's customers "$1000 buyer protection." The buyer protections can be offered by a third party that could be the seal provider, the entity, an online marketplace, an online payment provider, an insurance company, another party, or any combination of these. The buyer protection could be clearly and dynamically displayed on an entity's listing in an online marketplace to quickly build trust with a potential customer. The buyer protection gives further assurance to the buyer of the member's credibility, that a transaction will likely be successful, and that the buyer has assurances of monetary safeguards if not. The functionality utilizes the risk screening performed through compliance to help assess the risk-worthy nature of the seller in order to allow the protection to be credibly offered to the entity's customers. Seal verification and display systems can also allow an entity to choose from various levels of buyer protection to offer their customers, that could be priced differently to an entity. The entity can also be given the choice as to whether the buyer protection is displayed on the seal (or equivalent dynamic graphic and/or text) when displayed on their online marketplace listings or other areas their seal is displayed. Seal verification and display systems can provide further details by displaying a customized seal display page to elaborate on the buyer protection relevant to where the seal is seen.

The systems described herein can also control on an item-by-item level where protections or other membership status is displayed, which can be particularly relevant in an online marketplace where items can be listed separately, as opposed to browsing items within a "store" or website of a single merchant. Such functionality allows a buyer protection provider to control its risks in multiples ways. First it can control risk by seller level, where the verification and compliance systems provided a multiple variable analysis of a seller's credibility and based upon compliance can display a buyer protection or other assurances, such as a "guarantee" or display of trust building language like "trusted seller." Secondly the system can only display protections on certain items based on risk a buyer protection provider is willing to tolerate. This can be achieve in conjunction with claims rules associated with a buyer protection offering, where a buyer protection might have time limits to file a claim or other restrictions. With such rules, a system can ascertain how much total "risk" is open for historic transactions. Further a system can choose to only display monetary buyer protection up to a total level on both historic and current items listed. If for example a seller has 100 items with equal value totaling $10,000 for sale, and a system limit is set at $5000, the system can discretely only display buyer protection on the first 50 items and not on the other 50 items. As historic items age beyond the time requirements of the claims rules, the seller is eligible for a proportionate amount of buyer protection on new listings the entity lists to sell. Administered another way, a seller might be able to selectively choose which items display the buyer protection so as to more optimally manage the total limited display of protection at any given time. The variable nature might allow the seller to choose how they wish to distribute their "risk exposure", meaning the seller might only want to display added protection on higher value listings, e.g., items for sale over $500. Or in another way, an entity might offer one consumer $1000 in added buyer protection when bidding on a $1500 computer and only $200 of buyer protection when bidding on a $300 mp3 player. As such the total exposure can be minimized for current items for sale as opposed to a flat $1000 protection on all current listings. Administered another way, the system might be programmed to post the protection only on certain listings (e.g. over a certain value, only in certain categories of an online marketplace). All such means of administering dynamic display of buyer protections achieve the goal of offering added protection and added trust to buyers of approved members, while at the same time limiting the total exposure of the provider of the buyer protection in the event that the entity defrauds buyers. Further, based on risk scoring of entities, the system can allow different levels of total buyer protection or total risk exposure for different entities. For example an early member might be entitled to show no monetary protection and an experienced entity might be able to display a total amount of buyer protection many times greater than the average verified entity.

The systems can further authenticate the added buyer protection by clarifying the specific item number or transaction details in conjunction with the offer on the given listing. For example where the added buyer protection is displayed it might indicate the exact item description and item ID# from an online marketplace system, which can be achieved by data integration with an online marketplace. Further the buyer protection functionality can provide further details by a bidder or buyer clicking on the buyer protection text (or equivalent graphic functionality) to display the details of the program. Seal verification and display systems can also allow the entity to offer their own monetary and/or other types of protection to their users.

The seal verification and display systems can display a specified service level, for example a "seller guarantee" or a "money back guarantee." Non-monetary buyer protections such as a "seller guarantee" can also be dynamically displayed on a seal (or equivalent graphic display) or only on specific listings, to alert buyers to specific service level protections buyers are entitled to for a specific seller or program. Seal verification and display systems utilize the risk screening performed through compliance verification to help assess the risk-worthy nature of the seller. Further the display functionality can provide further details by a user clicking on the seal (or equivalent graphic functionality) to display a customized seal display page, or member profile page, relevant to where the seal is seen that can elaborate on the protection.

Seal verification and display systems can dynamically display customized program branding and associated seller information to be shown for special seal programs. For example this could include a "Motors Verified Seller" SquareTrade Seal on eBay, or "Licensed Alcohol Business" through Overture paid seach engine results advertising model, in which, along with co-branding, the seal can dynamically display other key information such as a seal member's verified business license on the seal, and possibly a specific third party backed monetary buyer protections specific to the seller or program, along with the current date or other authenticating details. Such functionality helps to prevent theft or copying of graphics. The combination of date/time, seller identification and branding create a complex image to copy in a credible fashion as the counterfeited image will soon display a date that is old and out of date or will display a userID that does not correspond to the seller selling the item, compared to the authenticated dynamically served image which is continually served and updated.

Display functionality can require specific member verification processes and pre-commitments of members, which can be defined by the seal issuer or the program sponsor, e.g., an online marketplace. Pre-commitments can include service commitments, and commitments to such post-purchase actions as participating in online dispute resolution or more specific dispute resolution such as binding arbitration. The seal display system can control whether the protections or pre-commitments are displayed, as well as what level of buyer protection is displayed, on a category and an item by item basis, based on parameters including: a) seal member choice, b) compliance/risk functionality of seal system that determines what program and/or how much monetary protection a member is eligible for, c) program specific offering of a seal system or a specific category, e.g., travel category specific seal on eBay, e) price or expected price of item, f) total risk exposure of member (as described above for dynamic buyer protection display functionality) The system also is able to vary where protections are shown, e.g., within an online marketplace but not on a seal member entity's website.

Other display functionality includes functionality for entities to easily display their selling policies on their websites, online marketplace listings or other online presence, through their electronic seal (or equivalent graphic display) or other means to further help entities better build trust with their bidders/buyers. The functionality provides better customer support and can avoid disputes in online selling, particularly in online marketplaces, such as eBay. The functionality enables easy creation and display of policies. The functionality can include a policy creation wizard-like tool for entities to easily, and at varying degrees of detail, customize their policies, drawing from standardized choices based on best practices in online marketplaces where used, e.g., eBay. The functionality then allows sellers to display the policies in multiple forms to integrate into their selling practices in online marketplaces or other online presence in a structured and easily repeatable method, including: 1) automatically posting the policies on individual item listings, e.g., on an auction listing, 2) allow bidders to view policies by clicking on the seller's seal (or equivalent graphic display), 3) delivering their policies in post-purchase communications between entity and buyer, so that buyer is reminded of what to expect and provided with clear instructions should there be issues, e.g., reminding buyer of protections, providing contact information, providing a link to an online dispute resolution system. An entity's polices are centrally stored and can be easily modified for repeated or varied use. The functionality allows entities to present policies in a condensed and accessible manner, while giving buyers the ability to learn more details by clicking on individual polices. The listing of the selling policies reduces the risk of buyers transacting with a particular online merchant by allowing buyers to see the entity's policies in advance of purchase or easily find policies should an issue occur later.

The dynamic display functionality of protections, guarantees, policies, program co-branding and other features helps to further increase trust with buyers in an online setting where sellers are often unbranded, helping to reduce significant ambiguities and perceived risks of purchasing items "site unseen" from unknown sellers. The dynamic display of buyer protections, and other information gives buyers authenticated assurances of purchasing rights. The dynamic display functionality also allows the seal programs compliance capability to customize what is displayed based on associated risk of a member. The functionality also allows specific programs to display category wide verification and protections, e.g., that seal member's business license(s) have been verified, to further attract the confidence of buyers, and ensure safety in the category.

Another display enhancement allows entities to proactively identify and address winning bidders who might be of a problematic nature. The system flags winning bidders, who, if otherwise not brought to the attention of the entities, might not pay for the item bid upon, or might provide spurious reputation damaging feedback regarding the entity through an online marketplace feedback/reputation system. The system provides entities a tool to select various parameters, tied to potentially risky bidders, under which the entity will be automatically alerted of recent closed sales. Parameters can be a default setting or can also be set by the entity and can include among other things: price of item, transaction experience in marketplace of bidder, age of transaction, location of bidder, and other marketplace specific factors such as whether the bidder recently changed their marketplace ID, made their feedback private, or whether the bidder's identification been verified by the marketplace. Based upon such parameters, the system compares transaction data from an online marketplace to update a database that fits the parameters as specific to an entity's choices or the default setting. The system can provide multiple means of communicating the bidder management report to enrolled entities, which can include: an email sent daily (or other defined frequency) or through and online accessible interface.

Presentation of the bidder management report allows the entity to easily identify which recent winning bidders might require more attention or post transaction support. The report can allow entities to see a list of "at risk" transactions, the associated bidder, and indication of at risk parameters identified. The functionality can also provide an easy means to email the bidder. The functionality can also provide easy access to an online dispute resolution system should it be required to settle a dispute. The processes provide such functionality to entities in online marketplaces to streamline and improve management of their online reputations and online fulfillment of their sales in an online marketplace setting.

In one embodiment, the present invention provides a method of determining continued compliance of an online entity doing business in electronic commerce, which has been previously approved for a seal of certification. Attributes of the online entity are monitored. Compliance of the online entity with requirements for the seal of certification is determined using a rule set based at least in part on the attributes of the online entity in electronic commerce. Appropriate action is taken based upon the determination.

In another embodiment, the invention provides a method of determining certification of an online entity doing business in electronic commerce with requiremnts for a level of certification. This certification may be displayed to buyers using a specific Seal of certification, or otherwise just stated to buyers in case all sellers within a certain marketplace or sub-marketplace meet these criteria. A request for approval of the seal of certification is received. Compliance of the online entity with requirements for the seal of certification is first determined using a first rule set based at least in part on the requirement for the seal of certification. The request is approved or denied based on such determination. If approved, attributes of the online entity are monitored. Compliance of the online entity using a second rule set based at least in part on the attributes of the online entity in electronic commerce is determined. Appropriate action based upon such second determination is taken.

In another embodiment, the invention provides a system for determining continued compliance of an online entity doing business in electronic commerce, which has been previously approved for a seal of certification. The system has a periodically updated datastore of attributes of the online entity in electronic commerce. A rules filter is operatively coupled to the datastore and configured to determine compliance based at least in part on the attributes of the online entity in electronic commerce.

In another embodiment, the invention provides a method of ensuring an online entity meets requirements for a seal of certification based on business activities of the online entity in electronic commerce. A media object representative of a dynamic seal of certification in connection with business activities of the online entity in electronic commerce is supplied. Attributes of the online entity in connection with electronic commerce is monitored. Compliance of the attributes of the online entity with requirements for the seal of certification is determined based on a rule set. The media object is updated based on such determination.

In another embodiment, the invention provides a system for ensuring an online entity meets requirements for a seal of certification based on business activities of the online entity in electronic commerce. An aggregated database is configured to store data reflecting a monitored status of attributes of the online entity in connection with electronic commerce. A server is configured to store a media object representative of the seal of certification and adapted to be communicated to a device for presentment to a user. The media object is updated based upon the monitored status.

In another embodiment, the invention provides a method of communicating a commitment of an online entity in an online marketplace to a selling practice to a potential buyer in the online marketplace. The commitment by the online entity in the online marketplace to the selling practice is accepted. A media object unique to the online entity which is representative of the commitment is delivered to a device for presentment to a user.

In another embodiment, the invention provides a method of communicating a commitment by an online entity in electronic commerce having a seal of certification to a selling practice to a user of electronic commerce. A media object representative of the seal of certification is delivered to a device for presentment to the user. The user is allowed to request information regarding the commitment using the media object. Information representative of the commitment of the user is delivered.

In another embodiment, the invention provides a method of communicating a commitment by an online entity in electronic commerce to a selling practice to a potential buyer in electronic commerce. The commitment by the online entity in the electronic commerce to the selling practice is accepted. A media object representative of the commitment is delivered to a device for presentment to the potential buyer. Compliance of the online entity to the commitment is monitored. The media object is updated based upon such monitoring.

In another embodiment, the invention provides a system for communicating a commitment by an online entity in electronic commerce to a selling practice to potential buyer in electronic commerce. A datastore is configured to store data reflecting the commitment of the online entity. A server is configured to store a media object representative of the commitment and adapted to be communicated to a device for presentment to the potential buyer.

In another embodiment, the invention provides a system for communicating a commitment by each of a plurality of online entities in electronic commerce to a selling practice to a potential buyer in electronic commerce. A datastore is configured to store data defining a set of online entities each having a unique identity. A datastore is configured to store data reflecting the commitment to the selling practice of each of the online entities. A server is configured to store a set of media objects retrievable based upon the unique identity. Each of the media objects represents a seal of certification corresponding to one of the set of online entities. The media object has indicia representative of the commitment of a corresponding one of the set of online entities.

In another embodiment, the invention provides a method of capturing and communicating selling practice information of an online entity in electronic commerce. The selling practice information is input into an online form by the online entity. The selling practice information is communicated in connection with a supply of a media object to a device for presentment to a user.

In another embodiment, the invention provides a method of communicating a commitment by an online entity in electronic commerce to online dispute resolution to a potential buyer in electronic commerce. The commitment by the online entity in electronic commerce to online dispute resolution is accepted. In the object unique to the online entity which is representative of the commitment is delivered to a device for presentment to the potential buyer.

In another embodiment, the invention provides a system for communicating a commitment by an online entity in electronic commerce to online dispute resolution to a potential buyer in electronic commerce. A datastore is configured to store data reflecting the commitment of the online entity. A server is configured to store a media object representative of the commitment and adapted to be communicated to a device for presentment to the potential buyer.

In another embodiment, the invention provides a system for communicating a commitment by each of a plurality of online entities in electronic commerce to online dispute resolution to a potential buyer and electronic commerce. A datastore is configured to store data defining a set of online entities each having a unique identity and certification status. A datastore is configured to store data reflecting the commitment to online dispute resolution of each of the online entities. A server is configured to store a set of media objects retrievable based upon the unique identity. Each of the media objects represents a seal of certification for a corresponding one of the set of online entities. The media object has indicia representative of the commitment of the corresponding one of the set of online entities.

In another embodiment, the invention provides a method of administering a plurality of entities in electronic commerce having requirements for a seal of certification. Attributes of the plurality of online entities are monitored. Compliance with the requirements for the seal of certification is determined using a predetermined rule set and the attributes. Each of the plurality of online entities is provided with a score representative of a degree of compliance. Each of the plurality of online entities who do not meet the requirements are prioritized based upon the score and a length of time the corresponding one of the pluralities of online entities have not met the requirements.

In another embodiment, the invention provides a method of administering a plurality of online entities electronic commerce having requirements for a seal of certification. Attributes of the plurality of online entities are monitored. One of the pluralities of entities is identified whose attributes indicate a failure to comply with the requirements using a predetermined rule set. An electronic communication to the one of the plurality of entities is automatically generated.

In another embodiment, the invention provides a method of indicating an online entity meets requirements for a seal of certification in one of a plurality of sectors of an online marketplace. Compliance of the online entity with requirements of the seal certification in one of the plurality of sectors of the online marketplace is determined. A dynamic media object representative of the seal of certification is maintained in connection with one of the plurality of sectors of the online marketplace. The media object is communicated to a device for presentment to a user of the one of the plurality of sectors of the online marketplace.

In another embodiment, the invention provides a system for indicating that one of a plurality of online entities meets requirements for a seal of certification in one of a plurality of sectors of an online marketplace. A datastore is configured to store data reflecting a status of the plurality of online entities with requirements of the seal of certification. A server is configured to store a plurality of media objects. Each of the pluralities of media objects is representative of the seal of certification for a corresponding one of the pluralities of online entities and a particular one of the pluralities of sectors of the online marketplace. The server is adapted to communicate a selected one of the plurality of media objects corresponding to the one of the plurality of online entities in the one of a plurality of sectors of the online marketplace.

In another embodiment, the invention provides a method of determining certification of an online entity doing business in electronic commerce for a seal of certification. A request for approval of the seal of certification is received. An online dispute resolution system is checked for a behavior of the online entity in connection with the online dispute resolution system. Compliance of the online entity is determined based at least in part on the behavior of the online entity in connection with the online dispute resolution system. The request is approved or denied based upon such determination.

In another embodiment, the invention provides a system for determining compliance of an online entity doing business in electronic commerce with requirements for a seal of certification. The system has a periodically updated datastore of attributes of the online entity in electronic commerce. A rules filter is operatively coupled to the datastore and configured to determine compliance based at least in part on a behavior of the online entity in connection with a dispute resolution system.

In another embodiment, the invention provides a method of determining continued compliance of an online entity doing business in an online marketplace, in which attributes of the online entity are monitored. Compliance of the online entity is determined using a rule set based at least in part on the attributes of the online entity in the electronic commerce, and whether the online entity can participate in the online marketplace is controlled based on the compliance determination.

In another embodiment, the invention provides a method for notifying a seller in an online marketplace of buyer activity in the online marketplace. According to the method transaction monitoring parameters are received from the seller. Transactions within the online marketplace that involve the seller are monitored to identify transactions based on the parameters, and the seller is alerted to identified transactions.

In another embodiment, the invention provides a system for notifying a seller in an online marketplace of buyer activity in the online marketplace. The system includes a database to store transaction monitoring parameters received from the seller, and a server. The server monitors transactions within the online marketplace that involve the seller to identify transactions based on the parameters, and alerts the seller to identified transactions.

In another embodiment, the invention provides a method for providing transaction protection to buyers in an online marketplace for transactions involving a seller in the online marketplace, wherein the seller is in compliance with requirements for certification in the online marketplace. According to the method a request is received from the seller for third party transaction protection, and whether third party transaction protection is available for transactions involving the seller in the online marketplace is indicated to the buyers.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 2 is a block diagram of an electronic commerce seal of certification compliance system.

FIG. 2a is a block diagram of an electronic commerce seal of certification verification and approval system.

FIG. 3 is a flow chart of a specialized seal display process in accordance with the present invention.

FIGS. 6 through 55 are screen shots or procedural flow diagrams of an implementation of the invention on an online marketplace.

DETAILED DESCRIPTION

Figure 1:
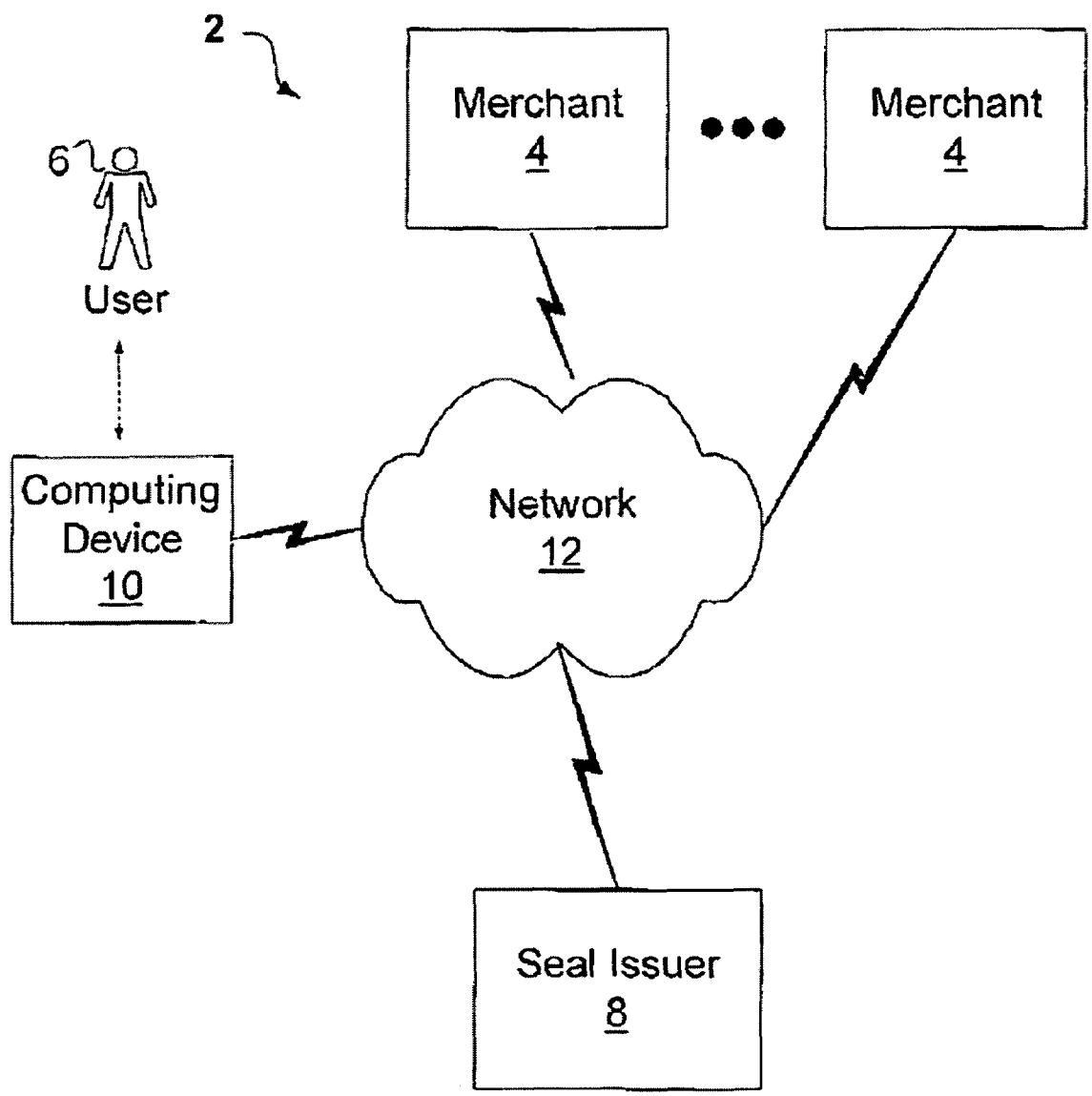
FIG. 1 is a high-level block diagram of an example system configured according to the invention.

FIG. 1 is a high-level block diagram of a system 2 in which online merchants, or online entities, 4 provide goods and services to user 6. Merchants 4 represent business entities that transact goods or services over a network 12, which represents a network of computing resources, such as the Internet. For example, a merchant 4 can be buyer or seller of goods, such as books, movies, software, computers, semiconductor components and the like. A merchant 4 can also be an entity that provides services over network 12, such as an online storage provider and Application Service Provider (ASP) or even an online marketplace or other intermediary. Although described in the context of a business entity, merchants 4 can also be any entity having an online presence.

User 6 uses computing device 10 to remotely interact with merchants 4 over network 12. Computing device 10 represents any communication device suitable for interfacing with network 12 and interacting with merchants 4, such as a personal computer running a web browser such as Internet Explorer™ from Microsoft Corporation of Redmond, Wash. Alternatively, computing device 4 can be, for example, a personal digital assistant (PDA), such as a Palm™ organizer from Palm Inc. of Santa Clara, Calif., or network-enabled cellular telephone.

Seal issuer 8 verifies the credentials, policies or business practices of each merchant 4 and issues a corresponding seal of certification to each merchant 4 upon verification. In order to become a "seal holder", each merchant 4 must comply with requirements set by seal issuer 8. Seal issuer 8 might, for example, verify that merchant 4 is a legitimate business merchant that complies with, or agrees to conform to, certain standards. For example, seal issuer 8 may be an online dispute resolution service that is designed to help buyers and sellers involved in online transactions resolve disputes, such as disputes that may arise in an online auction. In this instance, seal issuer 8 issues an electronic seal to merchants 4 that agree to participate in the web-based problem solving service, and to comply with other online selling standards. As another example, seal issuer 8 can be an organization that verifies that merchants 4 comply with privacy or security requirements. Alternatively, as another example, seal issuer 8 may perform a nominal amount of certification before issuing the seal, such as verifying contact information of merchants 4.

Upon verifying a merchant 4, seal issuer 8 issues to merchant 4 an electronic seal that is a recognizable symbol associated with certain qualities such as trustworthiness, reliability and superior customer service. Merchants 4 can post corresponding Hypertext Markup Language (HTML) code, or similar coding, on their web sites, online marketplace listings, or in electronic-mail messages. Alternatively, merchants 4 can request seal issuer to automatically insert such coding. The coding is posted or otherwise inserted such that, when a user views the online page, a seal or similar image will be dynamically served by seal issuer 8 if the merchant 4 is currently within compliance. Other processes can also be used to display the seal in conjunction with the above-described process, such as a process where a real-time check is made to determine whether the merchant 4 is under compliance before the seal or similar graphic is displayed. Display of the seal (or similar graphic) and related features helps to increase the confidence of potential customers. Unlike conventional techniques, seal issuer 8 does not issue a static image to merchants 4 that can be viewed at anytime once inserted in an online listing or website. As described in detail below, seal issuer 8 generates and maintains a database of seal members, tied to a compliance database and ongoing compliance process, such that a unique image can be displayed for each entity 4. The appearance of the image may be based on where the image is viewed, and whether the merchant 4 is currently performing within compliance of the seal requirements. As such, seal issuer 8 can instantly issue, update, change or revoke a seal when a merchant 4 fails to comply with requirements for the seal of certification. In addition, seal issuer 8 can track the use of all issued electronic seals in order to detect any misuse or theft of the seal.

FIG. 2 is a block diagram illustrating an exemplary embodiment of an electronic commerce seal of certification verification and approval system 13 that may be applied by seal issuer 8 in electronic commerce and online marketplaces, such as the environment illustrated in the block diagram of FIG. 1. Moreover, FIG. 2 illustrates exemplary rule-based compliance processes implemented by system 13.

The compliance processes performed by the system illustrated in the FIG. 2, as described below, can occur on a regular frequency, e.g., daily. An aggregated database, or datastore, 20 is configured to store current data related to compliance components for a plurality of online entities. Aggregated database 20 can be updated with data, such as electronic marketplace data 22 and dispute resolution history data 24. A rules filter 26 is coupled to aggregated database 20 and receives other information relating to an entity's attributes and activities in electronic commerce, e.g., an online marketplace. Components of attributes and activities are updated regularly with a master centralized member compliance status datastore 38 and can include: identification information 28, behavioral checks 30, selling profiles 32, and compliance actions from automated systems or administrators, such as suspension or probation requests 34. A determination made by rules filter 26 based on such information may result in an online entity passing all (block 36) of the rules filter 26 requirements for a seal of certification. This information is then stored in master centralized member compliance status datastore 38. Alternatively, the determination made by rules filter 26 may result in one or more failures causing escalation module 40 to escalate the determination to either an automated verification 42 or a manual administrative action 44 as determined by prioritization module 46 utilizing a prioritization algorithm.

Automated verification module 42 may request or otherwise retrieve further information, such as online marketplace user identification if it has changed, and further identity verification details that might include address, personal information, and business information of the online entity. Automated verification module 42 may request or otherwise retrieve further information utilizing automated techniques, which may include electronic messaging and accessing external online databases. This new information updates master centralized member compliance status datastore 38 and keeps the member in prioritized review mode until the following period in which rules filter 26 runs to check if member is determined to pass all 36, or enter the escalation process 40 again.

Manual administrative action 44 may result in immediate de-escalation 48, immediate suspension or rejection 50, or monitored probation 34. In this environment, monitored probation 34 may include a temporary relaxation of the requirements for approval of the seal of certification and the member may be more closely monitored in conjunction with this relaxing. Alternatively, manual administrative action 44 may conduct additional investigation or interrogation 52 of the online entity directly with the online entity. Direct investigation or interrogation 52 can include requesting further information such as online marketplace user identification if it has changed, and further identity verification details that might include address, personal information, and business information of the online entity. In some embodiments, the information may be checked through a third-party verification service 54. The results of the investigation 52 can cause an administrator to make an administrative action 44, which may include de-escalation 48, immediate suspension or rejection 50, or monitored probation 34. Further, the information gathered in the investigation 52 may be used to update master centralized member compliance status datastore 38, and keeps the member in prioritized review mode until the following period in which rules filter 26 determines whether the member is determined to pass all 36, or enters the escalation process 40 again.

Master centralized member compliance status datastore 38 is operatively coupled to seal display server 58 which operates to approve and serve an updated media object to computing device 10 (FIG. 1) for presentment to user 6 (FIG. 1) as a seal of certification based upon compliance and other entity attributes.

The processes and modules illustrated within rule-based compliance system 13 may be implemented on one or more web servers, database servers and application servers, or combinations thereof. The web servers may, for example, provide an interface by which user 6 communicate with rule-based compliance system 13 via network 12. In one configuration, the web servers execute web server software, such as Internet Information Server™ from Microsoft Corporation, of Redmond, Wash. As such, the web servers provide an environment for software modules for interacting with user 6. Similarly, the application servers may provide an operating environment for software modules for performing the described functionality and processes. The software modules may comprise Active Server Pages, web pages written in hypertext markup language (HTML) or dynamic HTML, Active X modules, Lotus scripts, Java scripts, Java Applets, Distributed Component Object Modules (DCOM) and the like. The software modules may be stored on computer-readable media, such as magnetic or optical discs, as executable instructions (i.e., program code) for execution by a programmable processor. Data stores 20, 22, 24, and 38 may be implemented in one or more of a variety of forms including data storage files, one or more database management systems (DBMS) executing on one or more database servers, or combinations thereof. The database management systems may be a relational (RDBMS), hierarchical (HDBMS), multidimensional (MDBMS), object oriented (ODBMS or OODBMS) or object relational (ORDBMS) database management system. The data could, for example, be stored within a single relational database such as SQL Server from Microsoft Corporation.

FIG. 2A is a flow diagram illustrating exemplary authentication and verification processes of the electronic commerce seal of certification verification and approval system 13 of FIG. 2. In the illustrated process, user 6 may access a seal of certification application 200 through various points of entry to the verification and approval system, such as links from an online marketplace. Certification application 200 requests information, which may include online marketplace identification information and contact information. The contact information may include an email address of an applying user.

Upon completion of application 200, system 13 sends a confirmation email to the applying user, and verifies whether the user has confirmed that they have received the email 202. The user may confirm receipt of the email, by, for example, clicking on a link in the email that brings the entity to a confirmation process. If user is a US domestic applicant, entity is requested to input identity verification information 204. The identity verification information can be checked real time with a third-party database 206. If the identify verification information provided is incorrect or otherwise fails, the applying user can be re-requested to input verifying information. If the identity of the applying user is successfully verified, the applying user is passed to the compliance processes discussed with reference to the compliance system illustrated in FIG. 2.

If the applying user fails to provide sufficient verification information for third-party verification tool 206, or if the applying user is international or otherwise from a region not covered in the third-party database, the applying user is sent a physical letter via postal service 220. The physical letter includes a confirmation code. Upon receipt of the letter, the applying user is prompted to enter the confirmation code 222 in an online secure interface. If the confirmation code is successful, the applying user is passed to the compliance processes discussed with reference to the compliance system illustrated in FIG. 2. If there is no response to the physical mail 224, the entity's application is rejected 230, and master centralized member compliance status database 38 is updated.

If the applying user successful passes compliance checks, the user is approved 240 and the master centralized member compliance status database 38 is updated. If the applicant does not pass compliance checks, the entity is rejected 230 and the master centralized member compliance status database 38 is updated.

FIG. 3 illustrates an application of a specialized seal display process in accordance with the present invention. The process shown may be carried out by electronic commerce seal of certification verification and approval system 13, and can operate in conjunction with an online marketplace. It should be recognized and understood, however, that the process is also applicable and other forms of electronic commerce, such as electronic commerce through a web site.

The exemplary process starts with an online marketplace linking a user to a registration process (block 110). Registration process 110 can link an entity to a specialized application process (block 112) for an online entity to sell in a specialized category, or specialized sector, of the online marketplace, e.g., if required or if the entity is not already registered to sell there. An example of a specialized sector of an online marketplace may be, for example, a specialized automotive, travel, or real estate marketplace. A link is provided or information may be passed (block 114) to a seal application process for the specialized marketplace sector or a generic seal application if appropriate. Compliance verification to the requirements for a seal of certification in the specialized marketplace sector, or sector of the online marketplace, is completed (block 116) in accordance with the system illustrated in FIGS. 2 and 2*a*. If the particular sector of the online marketplace is consistent with a marketplace having independent licensure, the application and verification process in block 116 may also require verification (block 118) of the independent license. An example would be verification of an automotive dealer license, verified employment at verified travel agency, or verified ownership of a timeshare or property being leased. Alternatively, an online entity may enter the application and verification process (block 116) directly (block 120) without a link from a specialized sector of the online marketplace.

Once the application and verification process is completed, the seal member profile and compliance database 38 of electronic commerce seal of certification verification and approval system 13 is updated. A periodic, for example, daily, update to and from the seal member profile and compliance database 38 is accomplished with a step (block 122) in which a specialize process automatically inserts special HTML onto all new listings of an entity or the online entity encodes the HTML themselves. The code provides a special code to reference seal display server 58. When online entity creates a new listing, e.g., a new item for sale, in the online marketplace (block 124), the new listing is linked to seal posting step in block 122.

In addition, the sub-marketplace may also verify prior to permitting the new listing in the sub-marketplace that the entity is authorized to sell in that sub-marketplace by checking with Compliance database 38. The sub-marketplace may decide to use the compliance database 38 to permit new listings (block 124), without requiring a Seal to be posted (block 122). In addition or instead of checking new listings, a marketplace may decide to periodically verify all active listings (block 124) within that sub-marketplace, against the compliance database 38, to verify that all listings do belong to that marketplace. This allows a sub-marketplace to utilize the power of the compliance database 38 and all prior approval and compliance algorithms without necessarily mandating or requiring that Seal posting (block 122) takes place.

Figure 4:
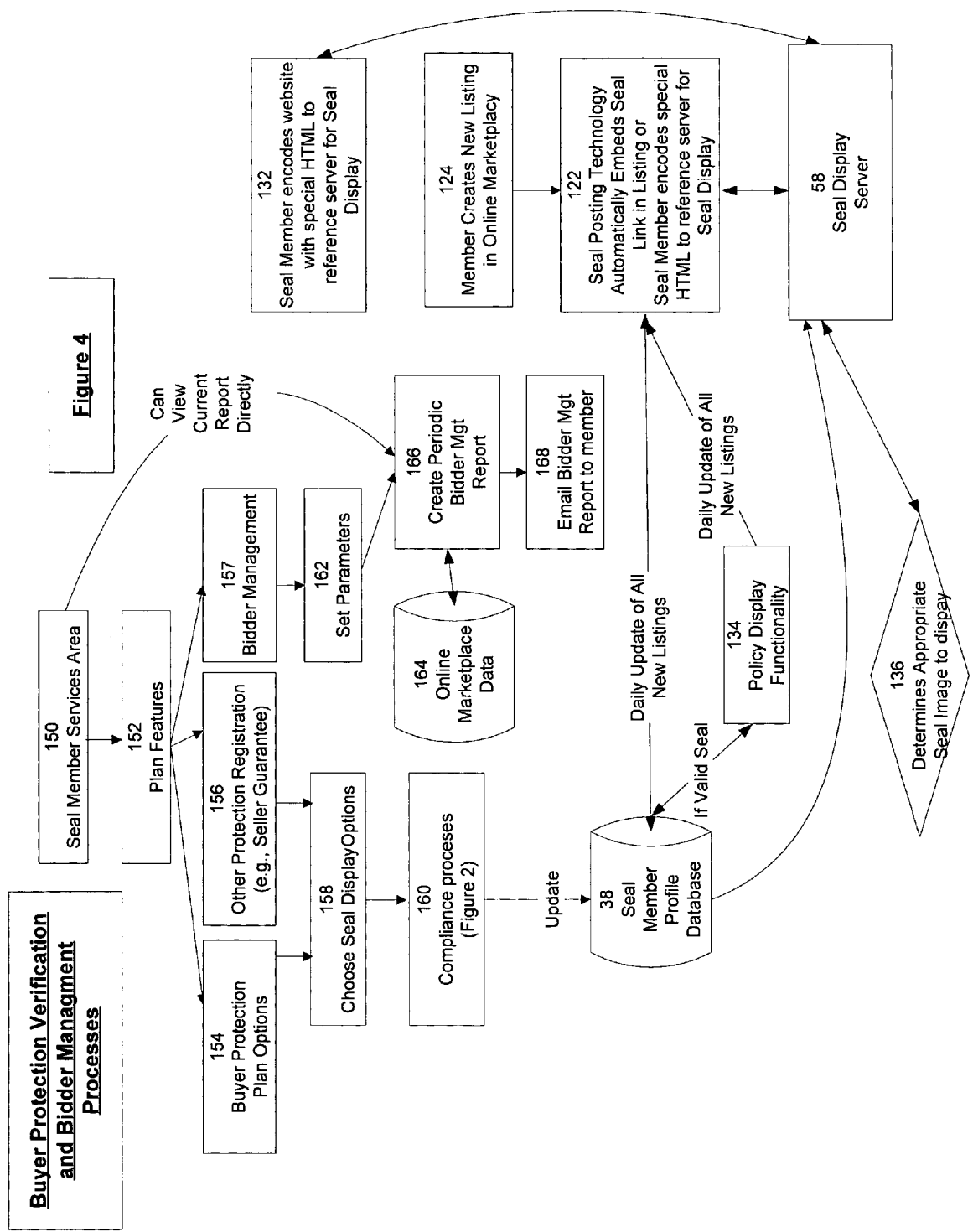
FIG. 4 is a flow chart of a buyer protection verification and display process in accordance with the present invention.

When a web page or online marketplace listing is viewed with code inserted, the seal server 58 will deliver the appropriate image. Seal server 58 determines an image to deliver by referencing master centralized member compliance status database 38 and an appropriate rule set 136. In this manner, seal server 58 may perform a real-time check of compliance before delivering a seal for display. An appropriate seal image can be selected based on compliance of the entity and requirements of the entity for a specific seal type (e.g., a motors verified seal). If the entity is determined to be in compliance and the entity has also enrolled in a policy display functionality process, the policies can also be posted on the listing 134 during the process of generating a new listing in an online marketplace FIG. 4 illustrates a buyer protection verification and display process carried out by electronic commerce seal of certification verification and approval system 13. From the seal member services area (block 150) the plan features (block 152) are explained and buyer protection plan options (block 154) other protection registration options (block 156), e.g., a seller guarantee, or other member services options including bidder management functionality (block 157), are provided. The buyer guarantee may comprises a guarantee provided by a third party. The online entity may select a guarantee level, and differing levels of the guarantee level have different prices to the online entity.

The online entity then chooses among a plurality of the seal display options (block 158), such as graphic options for the seal display, or whether the level of seller guarantee is displayed or not, as examples. Ongoing compliance verification processes, as illustrated in FIG. 2, are accomplished (block 160) prior to approval of buyer protections and inclusion in display functionality 58. Once completed, a master centralized member compliance status database 38 is updated.

If the entity enrolls in bidder management functionality 157, they may have the option to set specific parameters under which to be alerted of a recent winning bidders in an online marketplace 162. An online marketplace database 164 is periodically checked against the parameters, and a bidder management report is generated 166. The bidder management report may be made available to the entity to view online. Further a member can chose to have the report automatically sent to them via email 168. The parameters may include any of one of a price, an experience level in the marketplace for a buyer, a transaction age, a buyer location, a length of time participating in marketplace for a buyer, an age an account in the online marketplace for a buyer, or other parameter associated with the buyer.

The remainder of the process illustrated in FIG. 4 is similar to the corresponding portion of the process illustrated with respect to FIG. 3.

Figure 5:
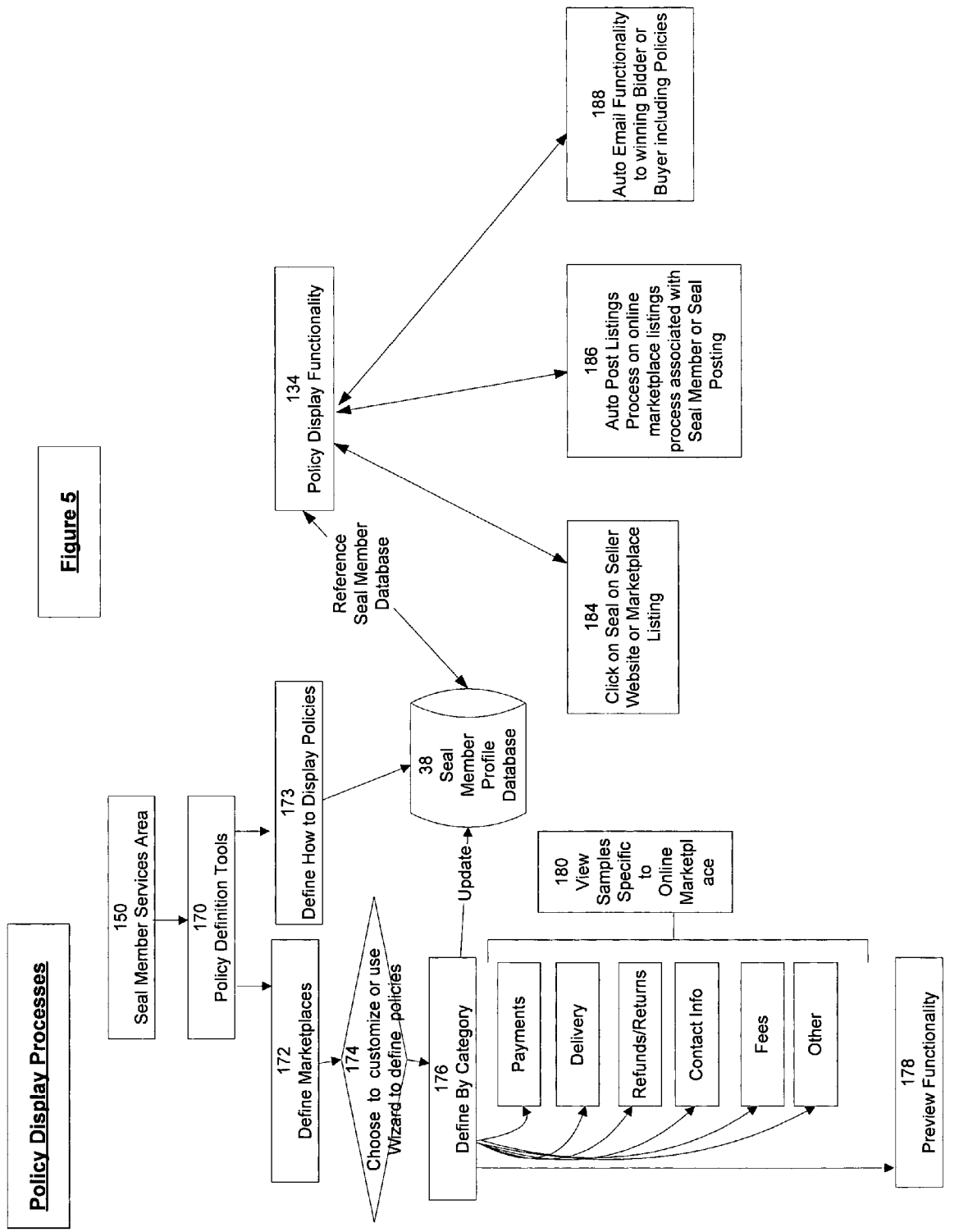
FIG. 5 is a flow chart of a policy display process in accordance with the present invention.

FIG. 5 illustrates a process for displaying online entity selling practices. From the seal member services area (block 150), an online entity links to policy definition tools (block 170). There the online entity defines (block 172) the online marketplace or sector of an online marketplace for which a selling practice, or selling practices, of the online entity is to be displayed. The online entity further determines how the policies will be displayed (block 173) with options that can include display in an online marketplace listing, or in an automated email to a winning bidder on an online marketplace. The online entity customizes (block 174) its selling practices or policies, or uses an online wizard (making a series of online selections) to choose selling practices or policies. The policies or practices are defined by category (block 176) such as payments, delivery, refunds and returns, contact information, fees or other information. The online entity is allowed to view samples (block 180) specific to the online marketplace or a particular sector of an online marketplace. When completed, the seal member profile database 38 is updated and the online entity is allowed to preview (block 178) the functionality of the selling practices or policies selected. Policies can be viewed through multiple display functionality 134 as defined in 173. The online entity may also choose to have the policies automatically displayed on new listings in an online marketplace 186, or automatically e-mail (block 188) such policies to a bidder, winning bidder or buyer. The entity can also define what is displayed when a user clicks on the seal (block 184).

Figure 6:
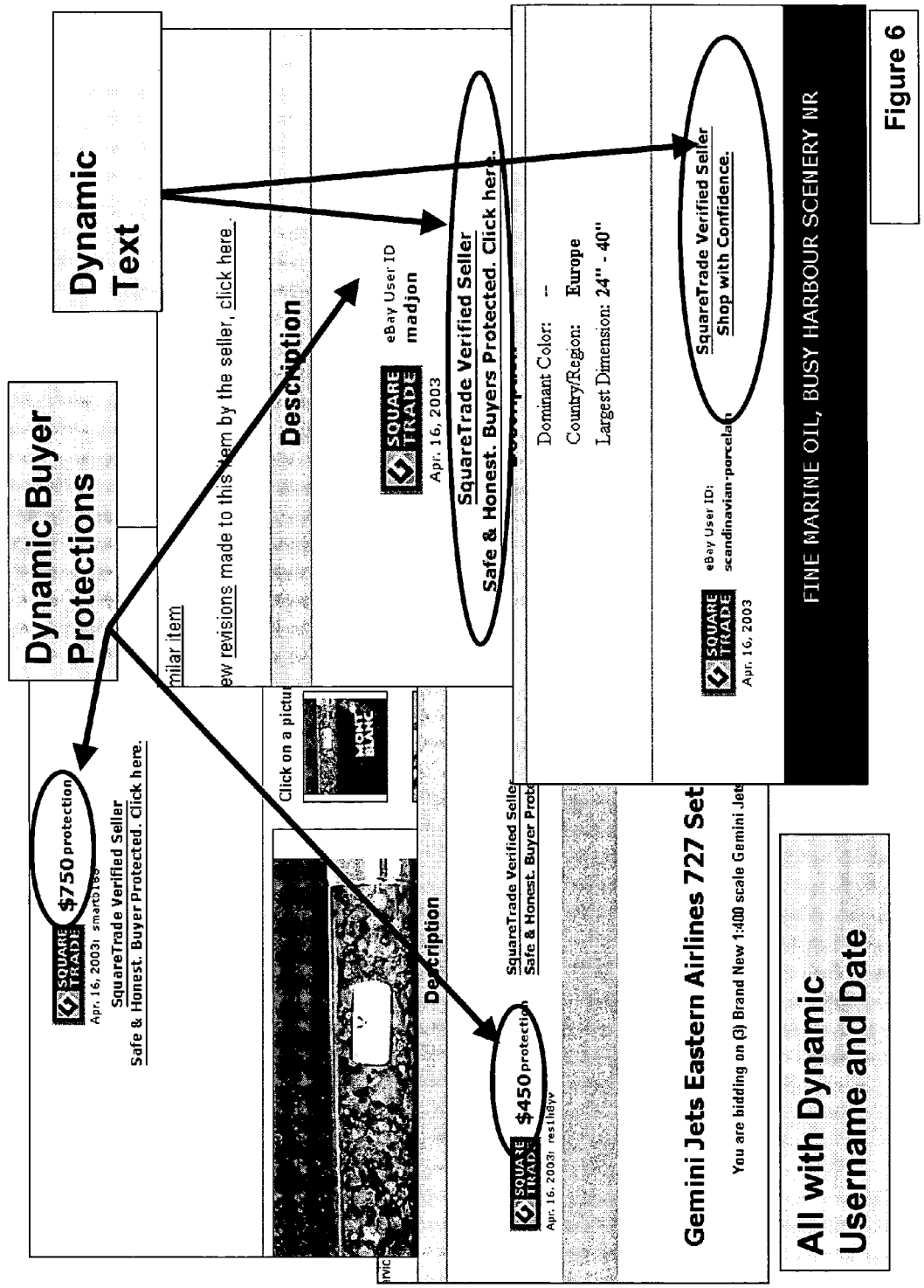

FIG. 6 is a collection of partial screenshots that illustrating sample listings in an online marketplace. The illustrated screenshots demonstrate how electronic commerce seal of certification verification and approval system 13 integrates the display of unique media objects for online entities (e.g., merchants 4) sponsoring the listings, and of dynamic text and other data indicating that the online entity is a verified seller. The illustrated screenshots also demonstrate dynamic buyer protections, such as a buyer protection level and unique online entity identification.

Figure 7:

FIG. 7 and FIG. 8 are screenshots of a dynamic display in which an online entity may choose to customize the content and placement of a media object representing a seal of certification issued by electronic commerce seal of certification verification and approval system 13 for use in conjunction with an online marketplace.

FIG. 9 is a screenshot of an option screen presented by electronic commerce seal of certification verification and approval system 13 to an online entity in which the online entity may select a particular level of buyer protection and bidder management functionality.

Figure 10:
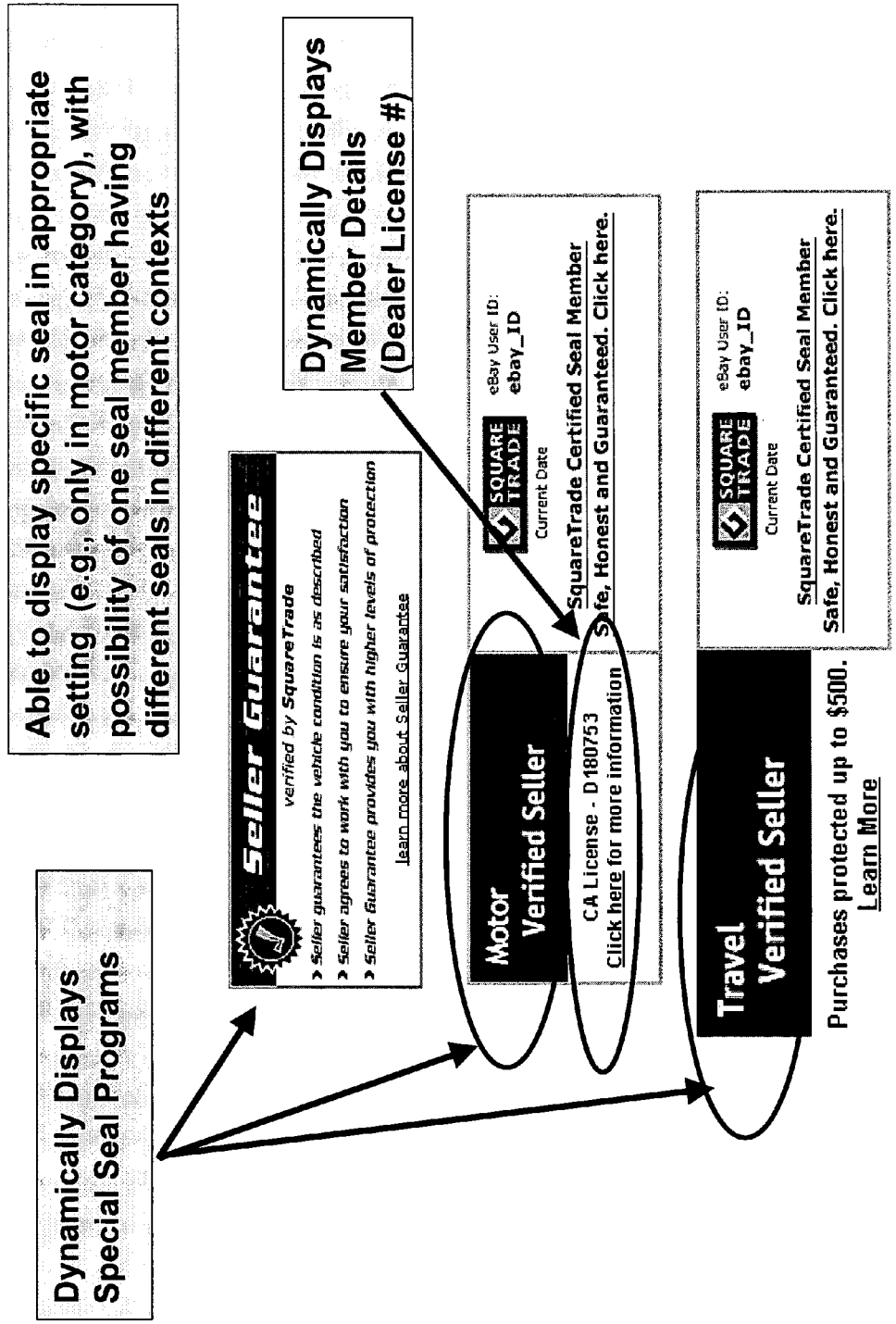

FIG. 10 are excerpts of screenshots illustrating the dynamic display of media objects representing seals of certification displaying, for example, a seller guarantee and a seal for particular sectors of an online marketplace (in this case motors or automotive and travel) including the display of independent licensure. In other words, electronic commerce seal of certification verification and approval system 13 dynamically generates media objects for display within particular sectors of an online marketplace. Electronic commerce seal of certification verification and approval system 13 may apply different compliance and verification processes for the different sectors.

FIG. 11 is a screenshot of a display of a media object representing a seal of certification for a particular sector of the marketplace, in this case motors or automotive.

Figure 12:

FIG. 12 is a screenshot of a display of a media object representing a seal of certification for a particular sector of the marketplace, in this case travel.

Figure 13:
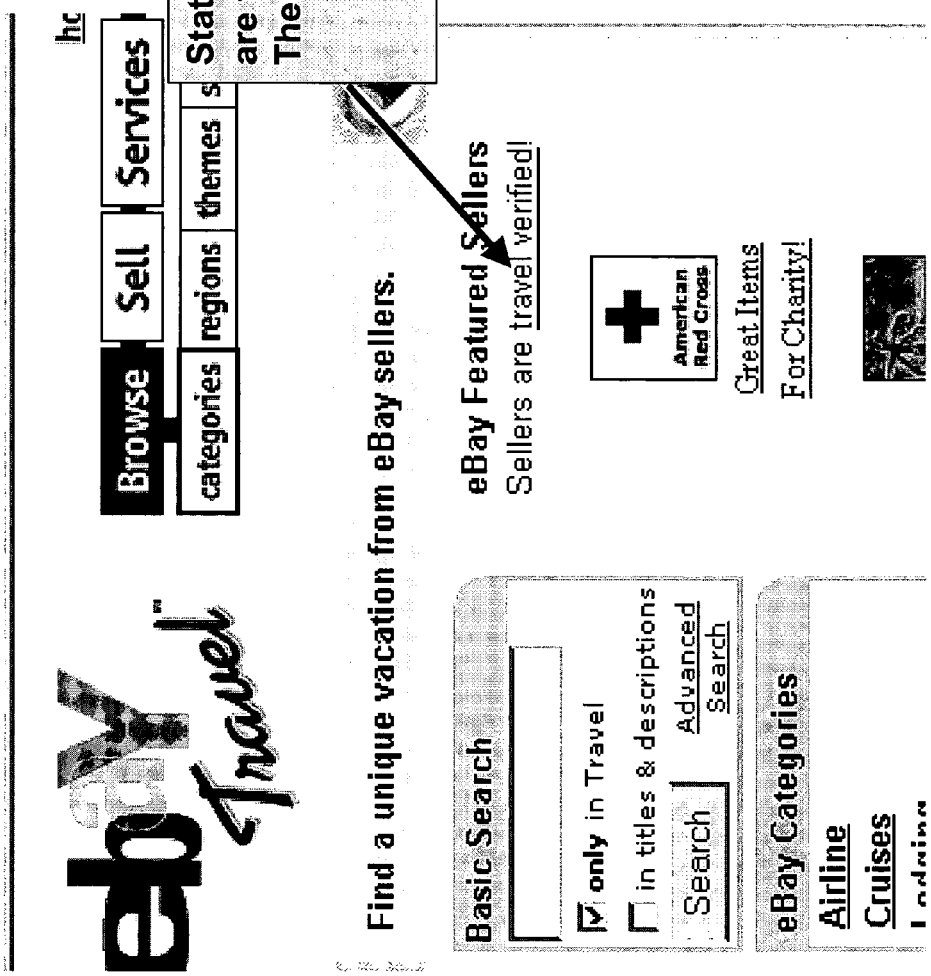

FIG. 13 and 14 illustrate user interfaces presented by system 13 for a specific sub-marketplace to state how all buyers that all listings within that specific sub-marketplace are meeting a set of approval and compliance criteria, including passing specific licensing checks, commitment to dispute resolution, buyer protection, and selling policies and standards. This may be further displayed to users using a specific Seal, but the sub-marketplace is marketing to all users that regardless, all sellers and items for sale meet certain criteria.

Figure 15:

FIG. 15 is a screenshot of a customizable seal of the certification display page viewable by a click through from a media object representing a seal of certification.

Figure 16:

FIG. 16 is a screenshot of a customized dynamic display and a media object representing a seal certification for a particular sector of a marketplace, in this case motors or automotive, including specific licensure details.

FIG. 17 includes excerpts of screenshots that illustrate a dynamic certification display page. The page is viewable by a click through from a media object representing a seal of certification, and can vary based on where seal is used. The illustrated excerpts illustrate a comparison of a single seal member's seal display page when clicked from a website or clicked from an online marketplace.

Figure 18:
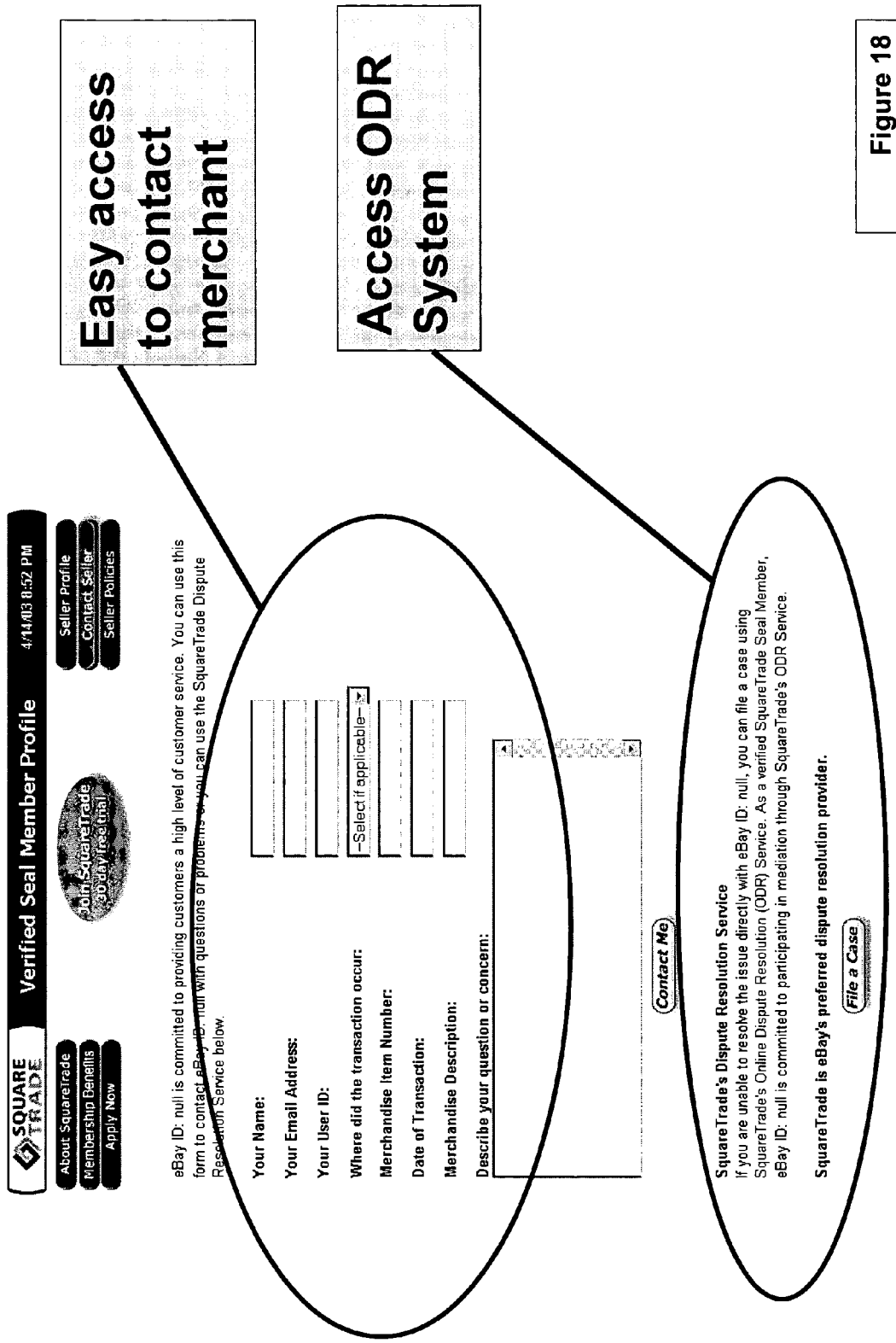
Figure 19:
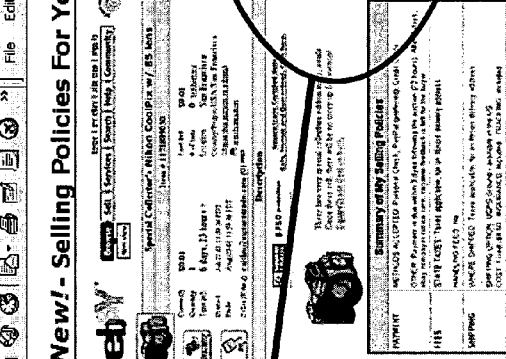

FIG. 18 is a screenshot of links available through a media object representing a seal of certification to enable viewers of the media object to have access to contact the merchant or online entity. FIG. 18 further illustrates a direct link to an online dispute resolution service or system.

Figure 23:
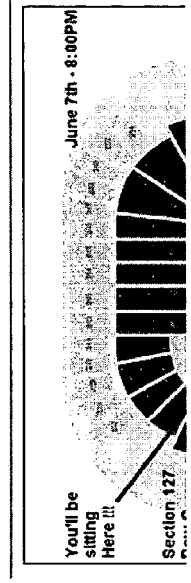
Figure 24:
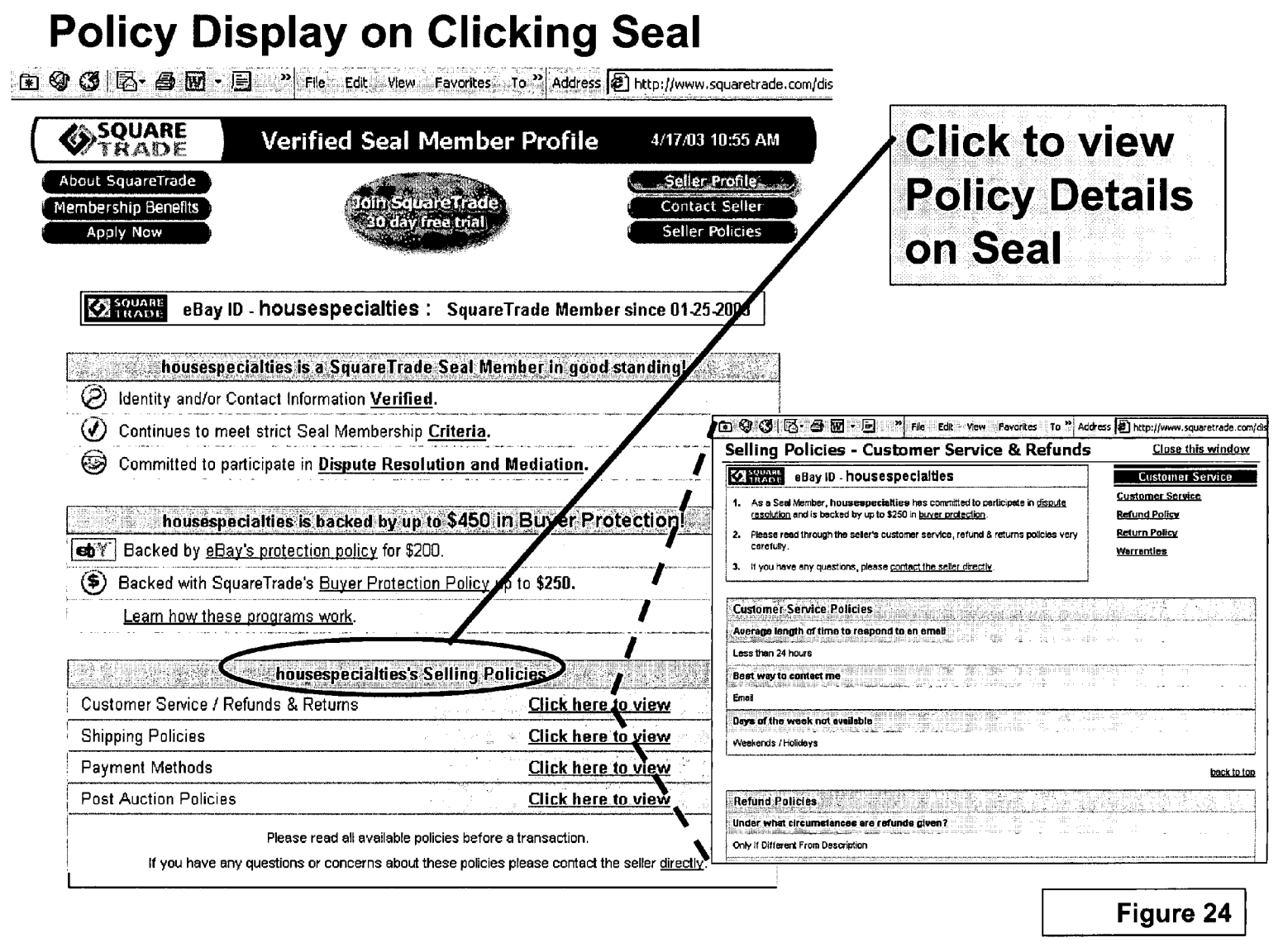

FIGS. 19-22 are screenshots illustrating policy or selling practice definition for an online entity, including a selling policy or practice creation tool using a wizard. FIG. 23 is a screenshot illustrating display of selling policies or selling practices of an online entity in the automotive sector of an online marketplace. FIG. 24 is a screenshot illustrating a click through to enable display of selling policy or selling practice details.

Figure 27:
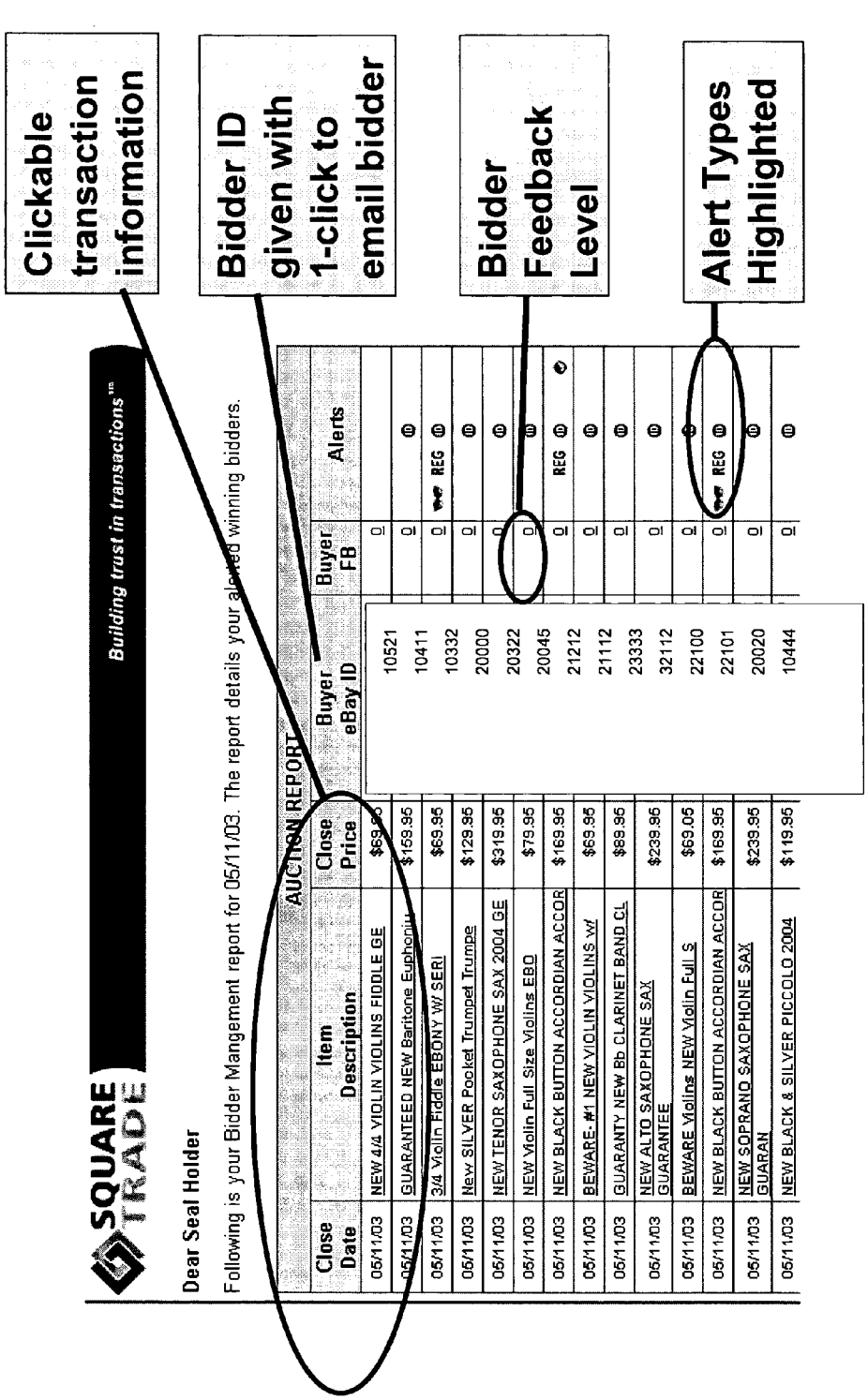

FIGS. 25-27 are screenshots illustrating bidder management functionality to set parameters and view reports via online access or a direct email.

Figure 28:
Figure 29:
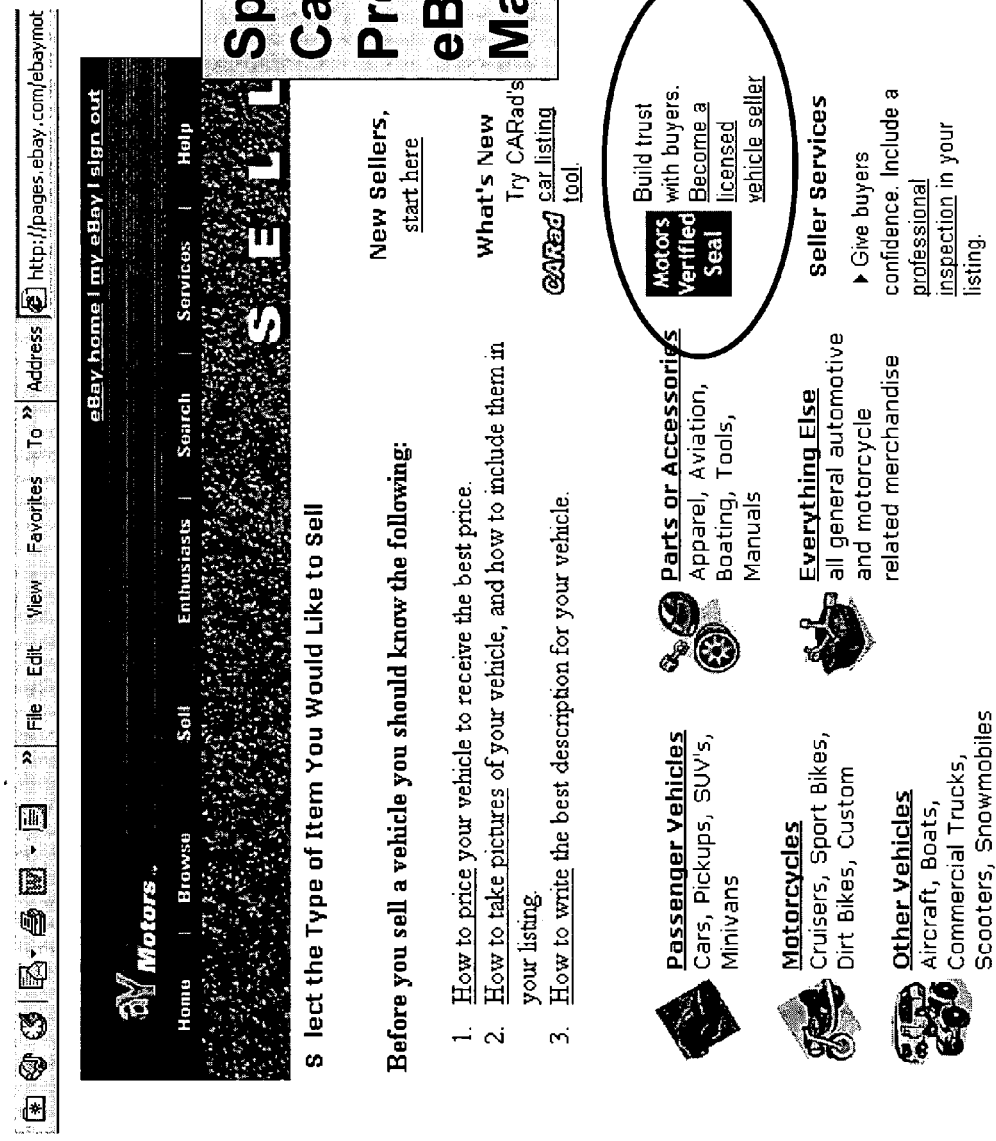
Figure 30:
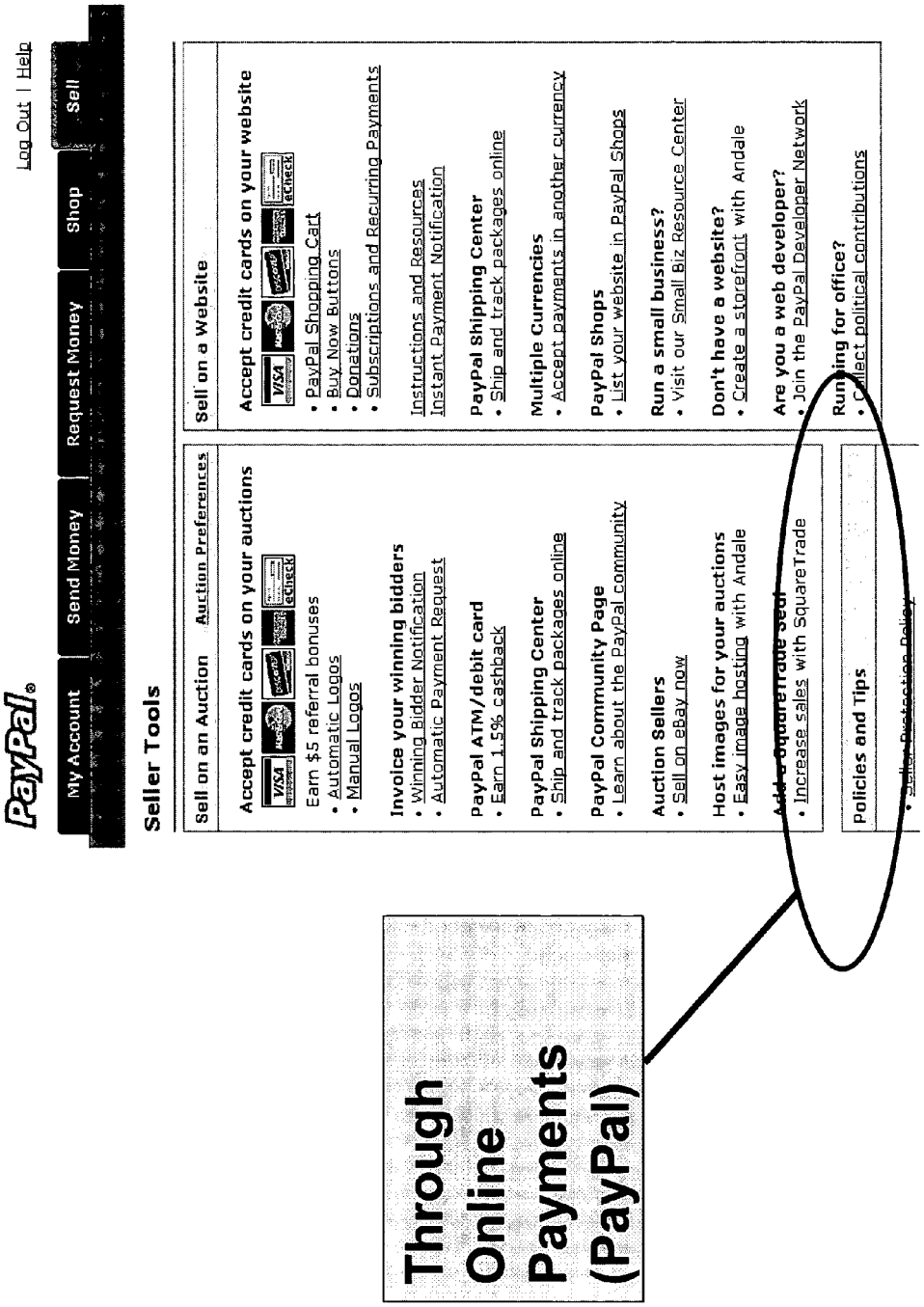
Figure 31:
Figure 39:

FIGS. 28-30 are screenshots illustrating links to access applications for a seal certification in an online marketplace including a link from an online payment service.

FIGS. 31-34 illustrate screenshots of a generic application for a seal of certification. FIGS. 35-39 illustrate screenshots of an application for a seal certification in a particular sector of an online marketplace. FIGS. 35-37 and 38-39 illustrate seal certification in travel and motors sectors of an online marketplace, respectively.

Figure 40:
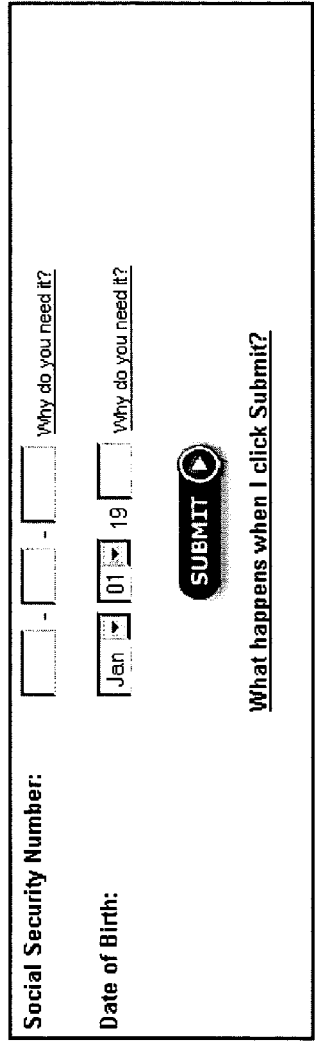
Figure 41:
Figure 43:
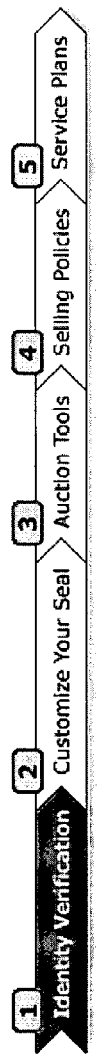

FIGS. 40-43 illustrate screenshots of identification of verification processes involved in compliance verification to meet requirements for a seal of certification. FIG. 40 illustrates real-time verification. FIG. 41 illustrates electronic message verification. FIG. 42 illustrates physical letter verification. FIG. 43 illustrates a successful verification.

Figure 44:
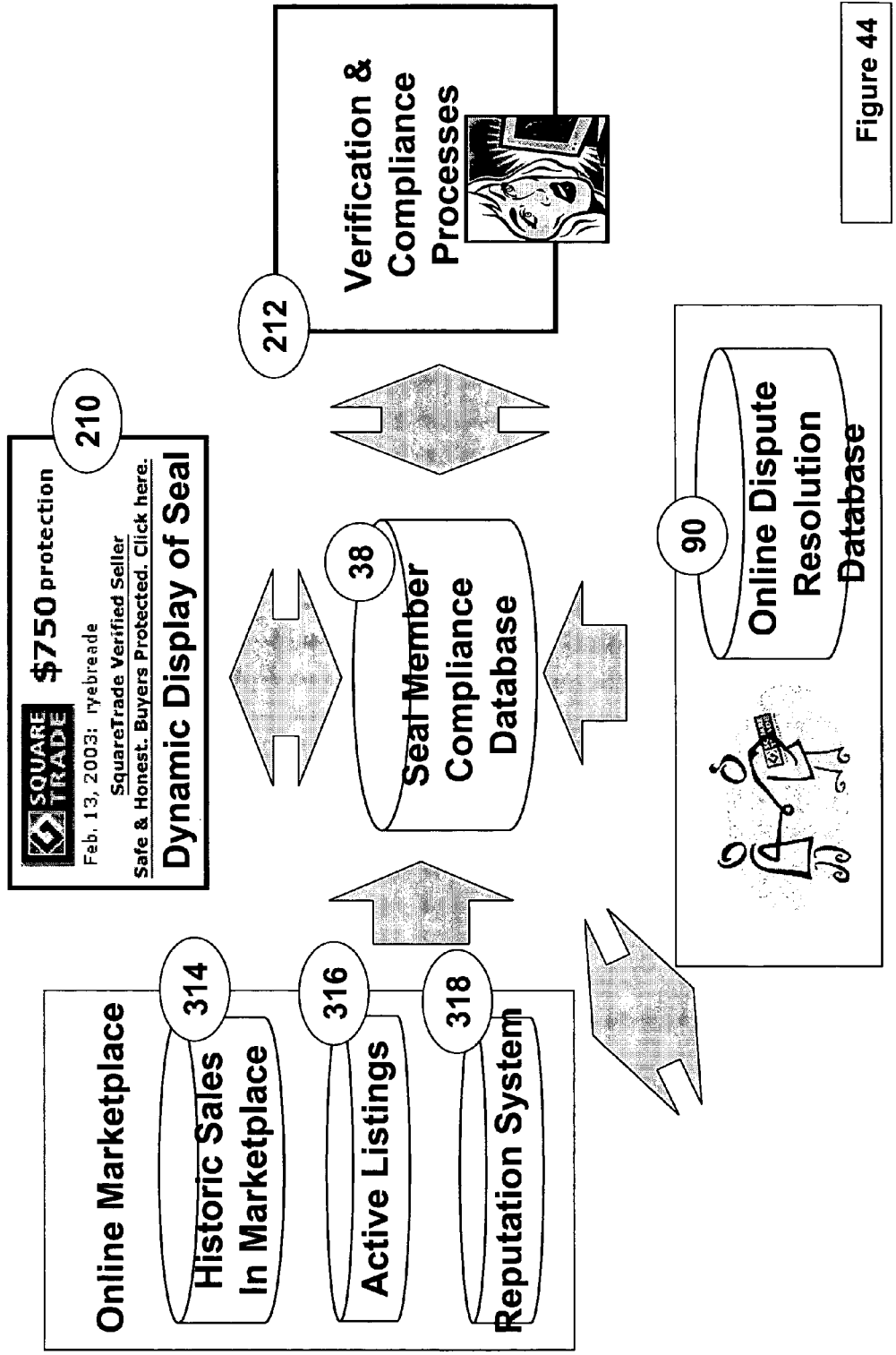

FIG. 44 is an overview of integrated systems supporting compliance verification in an online marketplace including seal member compliance database 38, a dynamic media object representing a seal certification 210, verification in compliance processes 212 (as illustrated in FIG. 2 and 2a), an online dispute resolution database 90 and information access to historical sales data 314, active listings 316 and reputation system 318.

Figure 45:
Figure 46:
Figure 47:
Figure 53:
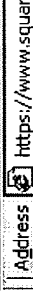

FIG. 45 illustrates a screenshot of compliance administrative search functionality. FIG. 46 is a screenshot illustrating escalation prioritization. FIG. 47 is a screenshot illustrating and administrative view of an online entity's electronic commerce risk. FIG. 48 is a screenshot illustrating an administrative overview of the status of various verifications conducted with respect to an online entity and which allows a compliance administrator to modify or set electronic commerce risk for an individual online entity. The screenshot in FIG. 48 also illustrates a compliance score calculated with respect to an individual online entity. FIG. 49 is a screenshot illustrating a compliance check summary for an online entity displaying an overall escalation score and compliance scores for each of a plurality of subcategories. FIG. 50 is a screenshot illustrating and administrative view of a compliance check screen allowing a probation setting. In one context, setting probation allows an online entity temporary relaxation of requirements for a seal of certification. FIG. 51 is a screenshot illustrating an administrator's view allowing adjustment of approval parameters with respect to specific sectors of an online marketplace. FIG. 52 is a screenshot illustrating an escalation screen waiting for a manual action. FIG. 53 and FIG. 54 are screenshots illustrating an electronic message requesting additional information from an online entity. FIG. 55 is a screenshot illustrating a request to an online entity to provide more information as a result of an escalation in compliance administration.

Various modifications and alterations of this invention will be apparent to those skilled in the art without departing from the scope and spirit of this invention. It should be understood that this invention is not limited to the illustrative embodiments set forth above.

What is claimed is:

1. A method of communicating a commitment made by an online entity in an online marketplace to a selling practice, the commitment communicated to a potential buyer in the online marketplace, the method comprising:
   accepting the commitment by the online entity in the online marketplace to the selling practice prior to any interaction in the online marketplace between the online entity and the potential buyer, wherein the selling practice comprises providing a buyer guarantee to address post-sale buyer dissatisfaction, and wherein the online entity selects a guarantee level;
   monitoring compliance of the online entity with the commitment to the selling practice during previous interactions with previous buyers, prior to any interaction in the online marketplace between the online entity and the potential buyer;
   when the entity fails to comply with the commitment to the selling practice, automatically restricting display of the online entity as a result of a search engine; and
   when the entity complies with the commitment to the selling practice, delivering a media object to a device for presentment to the potential buyer, the media object representative of the commitment and comprising an electronic seal of certification.

2. The method of claim 1 wherein the selling practice comprises use of an online payment system.

3. The method of claim 1 wherein the buyer guarantee is monetary.

4. The method of claim 1 wherein the buyer guarantee is service delivery monetarily backed.

5. The method of claim 1 wherein the buyer guarantee comprises a guarantee provided by a third party.

6. The method of claim 1 wherein differing levels of the guarantee level have different prices to the online entity.

7. The method of claim 1 wherein accepting the commitment comprises accepting the commitment online.

8. The method of claim 1 further comprising delivering a non-unique second media object supplied by a system associated with an online marketplace.

9. The method of claim 8 wherein the media object which is representative of the commitment is unique to the online entity and presented together with the second media object supplied by the system of the online marketplace.

10. The method of claim 1, further comprising:
   allowing the potential buyer to request information regarding the commitment using the media object; and
   delivering information representative of the commitment to the potential buyer.

11. The method of claim 1, further comprising displaying the media object to include a marketplace identification or a business name for the online entity.

12. The method of claim 1, further comprising displaying the media object to include information specific to a program within an online marketplace.

13. The method of claim 1, further comprising displaying the media object to include a particular sub-marketplace of the marketplace.

14. The method of claim 1, further comprising displaying the media object to include information for a specific result displayed through the search engine.

15. The method of claim 1, further comprising displaying the media object as a portion of results from the search engine.

16. The method of claim 1, wherein monitoring compliance comprises monitoring historical or current marketplace data.

17. The method of claim 16, wherein the marketplace data comprises a reputation rating of the online entity.

18. The method of claim 16, wherein the marketplace data comprises sales characteristics of the online entity.

19. The method of claim 1, wherein the commitment to the selling practice further comprises a commitment to participate in a post-sale online dispute resolution process.

20. The method of claim 1, wherein the commitment to the selling practice further comprises at least one of a commitment to participate in a post-sale online dispute resolution process or a commitment to disclose a post-sale service policy.

21. A method of communicating a commitment made by an online entity in an online marketplace to a selling practice, the commitment communicated to a potential buyer in the online marketplace, the method comprising:
   accepting the commitment by the online entity in the online marketplace to the selling practice prior to any interaction in the online marketplace between the online entity and the potential buyer;
   monitoring compliance of the online entity with the commitment to the selling practice during previous interactions with previous buyers, prior to any interaction in the online marketplace between the online entity and the potential buyer;
   when the entity fails to comply with the commitment to the selling practice, automatically restricting display of the online entity as a result of a search engine; and when the entity complies with the commitment to the selling practice, delivering a media object to a device for presentment to the potential buyer, the media object representative of the commitment and comprising an electronic seal of certification,
   wherein the delivering is optional with the online entity.

22. The method of claim 21, wherein the selling practice comprises use of an online payment system.

23. The method of claim 21, wherein the selling practice comprises providing a buyer guarantee to address post-sale buyer dissatisfaction.

24. The method of claim 23, wherein the buyer guarantee is monetary.

25. The method of claim 23, wherein the buyer guarantee is service delivery monetarily backed.

26. The method of claim 23, wherein the buyer guarantee comprises a guarantee provided by a third party.

27. The method of claim 23, wherein the online entity selects a guarantee level.

28. The method of claim 23, wherein differing levels of the guarantee level have different prices to the online entity.

29. The method of claim 21, wherein accepting the commitment comprises accepting the commitment online.

30. The method of claim 21, further comprising delivering a non-unique second media object supplied by a system associated with an online marketplace.

31. The method of claim 30, wherein the media object which is representative of the commitment is unique to the online entity and presented together with the second media object supplied by the system of the online marketplace.

32. The method of claim 21, further comprising:
   allowing the potential buyer to request information regarding the commitment using the media object; and
   delivering information representative of the commitment to the potential buyer.

33. The method of claim 32, wherein the allowing step is accomplishing by allowing the potential buyer to click on the media object.

34. The method of claim 21, further comprising displaying the media object to include a marketplace identification or a business name for the online entity.

35. The method of claim 21, further comprising displaying the media object to include information specific to a program within an online marketplace.

36. The method of claim 21, further comprising displaying the media object to include a particular sub-marketplace of the marketplace.

37. The method of claim 21, further comprising displaying the media object to include information for a specific result displayed through the search engine.

38. The method of claim 21, further comprising displaying the media object as a portion of results from the search engine.

39. The method of claim 21, wherein monitoring compliance comprises monitoring historical or current marketplace data.

40. The method of claim 39, wherein the marketplace data comprises a reputation rating of the online entity.

41. The method of claim 39, wherein the marketplace data comprises sales characteristics of the online entity.

42. The method of claim 21, wherein the commitment to the selling practice comprises a commitment to participate in a post-sale online dispute resolution process.

43. The method of claim 21, wherein the commitment to the selling practice comprises at least one of a commitment to participate in a post-sale online dispute resolution process, a commitment to disclose a post-sale service policy, or a commitment to a buyer guarantee that addresses post-sale buyer dissatisfaction.

44. A method of communicating a commitment made by an online entity in an online marketplace to a selling practice, the commitment communicated to a potential buyer in the online marketplace, the method comprising:
   accepting the commitment by the online entity in the online marketplace to the selling practice prior to any interaction in the online marketplace between the online entity and the potential buyer;
   monitoring compliance of the online entity with the commitment to the selling practice during previous interactions with previous buyers, prior to any interaction in the online marketplace between the online entity and the potential buyer;
   when the entity fails to comply with the commitment to the selling practice, automatically restricting display of the online entity as a result of a search engine; and
   when the entity complies with the commitment to the selling practice, delivering a media object to a device for presentment to the potential buyer, the media object representative of the commitment and comprising an electronic seal of certification,
   allowing the potential buyer to request information regarding the commitment using the media object; and
   delivering information representative of the commitment to the potential buyer, wherein the allowing step is accomplishing by allowing the potential buyer to click on the media object.

45. The method of claim 44, wherein the selling practice comprises use of an online payment system.

46. The method of claim 44, wherein the selling practice comprises providing a buyer guarantee to address post-sale buyer dissatisfaction.

47. The method of claim 46, wherein the buyer guarantee is monetary.

48. The method of claim 46, wherein the buyer guarantee is service delivery monetarily backed.

49. The method of claim 46, wherein the buyer guarantee comprises a guarantee provided by a third party.

50. The method of claim 46, wherein the online entity selects a guarantee level.

51. The method of claim 46, wherein differing levels of the guarantee level have different prices to the online entity.

52. The method of claim 44, wherein the delivering is optional with the online entity.

53. The method of claim 44, wherein accepting the commitment comprises accepting the commitment online.

54. The method of claim 44, further comprising delivering a non-unique second media object supplied by a system associated with an online marketplace.

55. The method of claim 54, wherein the media object which is representative of the commitment is unique to the online entity and presented together with the second media object supplied by the system of the online marketplace.

56. The method of claim 44, further comprising displaying the media object to include a marketplace identification or a business name for the online entity.

57. The method of claim 44, further comprising displaying the media object to include information specific to a program within an online marketplace.

58. The method of claim 44, further comprising displaying the media object to include a particular sub-marketplace of the marketplace.

59. The method of claim 44, further comprising displaying the media object to include information for a specific result displayed through the search engine.

60. The method of claim 44, further comprising displaying the media object as a portion of results from the search engine.

61. The method of claim 44, wherein monitoring compliance comprises monitoring historical or current marketplace data.

62. The method of claim 61, wherein the marketplace data comprises a reputation rating of the online entity.

63. The method of claim 61, wherein the marketplace data comprises sales characteristics of the online entity.

64. The method of claim 44, wherein the commitment to the selling practice comprises a commitment to participate in a post-sale online dispute resolution process.

65. The method of claim 44, wherein the commitment to the selling practice comprises at least one of a commitment to participate in a post-sale online dispute resolution process, a commitment to disclose a post-sale service policy, or a commitment to a buyer guarantee that addresses post-sale buyer dissatisfaction.

* * * * *